US012743870B2

(12) United States Patent
Takehara

(10) Patent No.: US 12,743,870 B2
(45) Date of Patent: Sep. 22, 2026

(54) IMAGE CLASSIFICATION APPARATUS, IMAGE CLASSIFICATION METHOD, AND NON-TRANSITORY COMPUTER-READABLE MEDIUM HAVING IMAGE CLASSIFICATION PROGRAM

(71) Applicant: JVCKENWOOD Corporation, Yokohama (JP)

(72) Inventor: Hideki Takehara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 223 days.

(21) Appl. No.: 18/783,510

(22) Filed: Jul. 25, 2024

(65) Prior Publication Data

US 2024/0378860 A1 Nov. 14, 2024

Related U.S. Application Data

(63) Continuation of application No. PCT/JP2023/002421, filed on Jan. 26, 2023.

(30) Foreign Application Priority Data

Jan. 28, 2022 (JP) ................................ 2022-011989
Jan. 28, 2022 (JP) ................................ 2022-011990

(51) Int. Cl.
*G06V 10/764* (2022.01)
*G06V 10/44* (2022.01)

(52) U.S. Cl.
CPC ............ *G06V 10/764* (2022.01); *G06V 10/44* (2022.01)

(58) Field of Classification Search
CPC ............................ G06V 10/764; G06V 10/44
See application file for complete search history.

(56) References Cited

U.S. PATENT DOCUMENTS

2010/0296706 A1* 11/2010 Kaneda ................. G06V 10/50 382/168
2023/0386252 A1* 11/2023 Kim ......................... G06T 3/40

OTHER PUBLICATIONS

International Preliminary Report on Patentability from International Application No. PCT/JP2023/002421 mailed Jul. 30, 2024, 8 pages.
International Search Report from International Application No. PCT/JP2023/002421 mailed Mar. 7, 2023, 4 pages.

(Continued)

*Primary Examiner* — David F Dunphy
(74) *Attorney, Agent, or Firm* — Shih IP Law Group, PLLC

(57) ABSTRACT

A feature extraction unit extracts a low-resolution general feature vector of an input image and a high-resolution detailed feature vector of the input image. A general feature distance measurement unit maintains a general weight vector of each class and calculates a general distance vector from the general feature vector and the general weight vector. A detailed feature distance measurement unit maintains a detailed weight vector of each class and calculates a detailed distance vector from the detailed feature vector and the detailed weight vector. A feature distance synthesis unit calculates a synthesized distance vector by synthesizing the general distance vector and the detailed distance vector. A global classification unit determines a class of the input image based on the synthesized distance vector.

4 Claims, 21 Drawing Sheets

(56) References Cited

OTHER PUBLICATIONS

Wei-Yu Chen, et al, "A Closer Look at Few-Shot Classification", published as a conference paper at ICLR 2019, arXiv:1904.04232v2 [cs.CV] Jan. 12, 2020, 17 pages.
X. Tao, et al., "Few-Shot Class-Incremental Learning", arXiv:2004.10956v2 [cs.CV] Apr. 24, 2020, 11 pages.
Extended European Search Report from EP Application No. 23747028.1 mailed May 9, 2025, 7 pages.
Jiang Wen et al: "Multi-Scale Metric Learning for Few-Shot Learning", IEEE Transactions on Circuits and Systems for Video Technology, IEEE, USA, vol. 31, No. 3, May 20, 2020 (May 20, 2020), pp. 1091-1102, XP011842718, ISSN: 1051-8215, DOI: 10.1109/TCSVT.2020.2995754 [retrieved on Mar. 4, 2021].

* cited by examiner

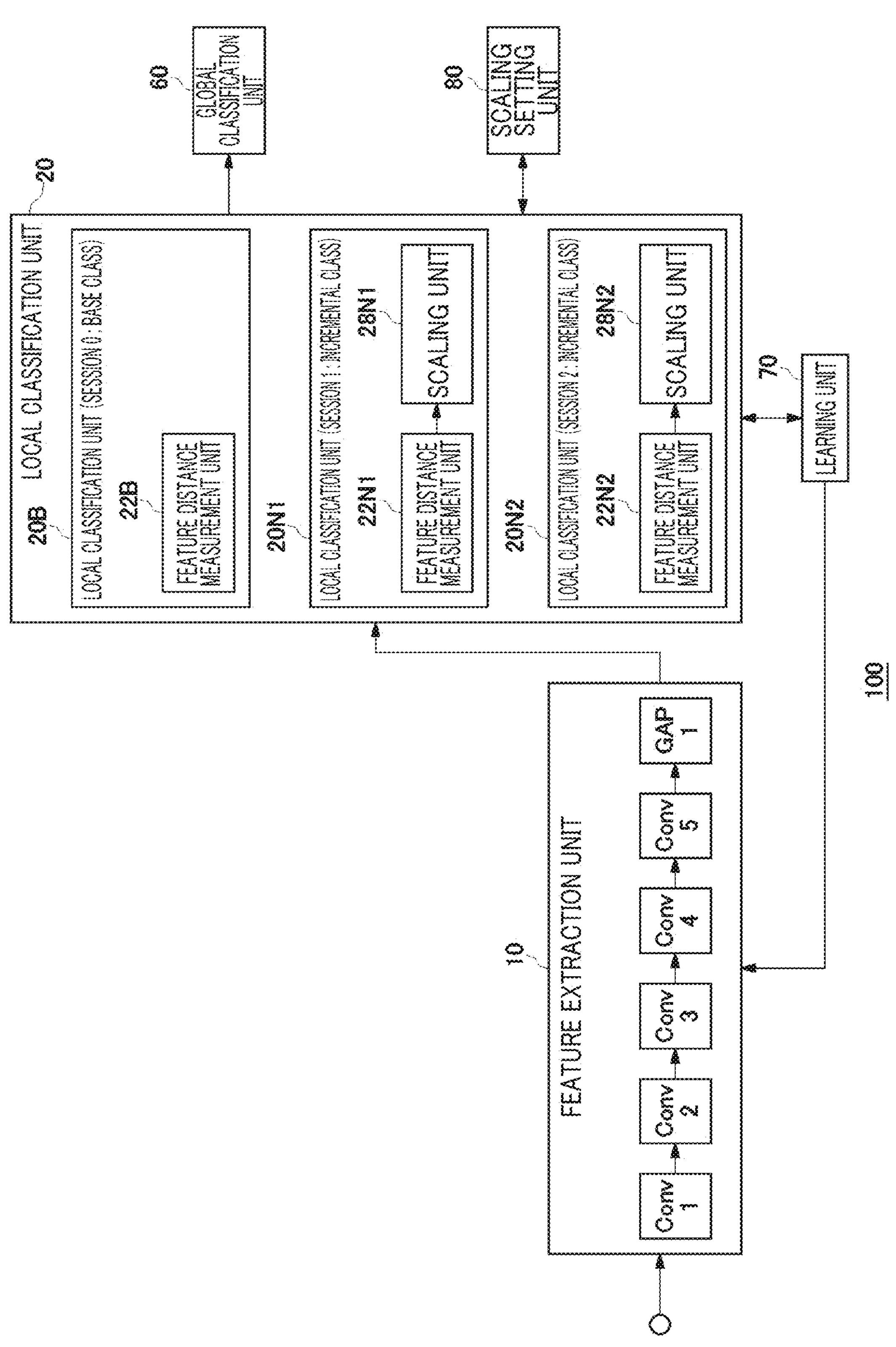
FIG. 1
100
20
LOCAL CLASSIFICATION UNIT
20B
LOCAL CLASSIFICATION UNIT (SESSION 0 : BASE CLASS)
22B
FEATURE DISTANCE MEASUREMENT UNIT
20N1
LOCAL CLASSIFICATION UNIT (SESSION 1 : INCREMENTAL CLASS)
22N1
FEATURE DISTANCE MEASUREMENT UNIT
28N1
SCALING UNIT
20N2
LOCAL CLASSIFICATION UNIT (SESSION 2 : INCREMENTAL CLASS)
22N2
FEATURE DISTANCE MEASUREMENT UNIT
28N2
SCALING UNIT
60
GLOBAL CLASSIFICATION UNIT
80
SCALING SETTING UNIT
70
LEARNING UNIT
10
FEATURE EXTRACTION UNIT
Conv 1
Conv 2
Conv 3
Conv 4
Conv 5
GAP 1

10
FEATURE EXTRACTION UNIT
Conv 1
Conv 2
Conv 3
Conv 4
Conv 5
GAP 1
20B
LOCAL CLASSIFICATION UNIT (SESSION 0 : BASE CLASS)
22B
FEATURE DISTANCE MEASUREMENT UNIT
20N2
LOCAL CLASSIFICATION UNIT (SESSION 2 : INCREMENTAL CLASS)
22N2
FEATURE DISTANCE MEASUREMENT UNIT
28N2
SCALING UNIT
70
LEARNING UNIT
80
SCALING SETTING UNIT

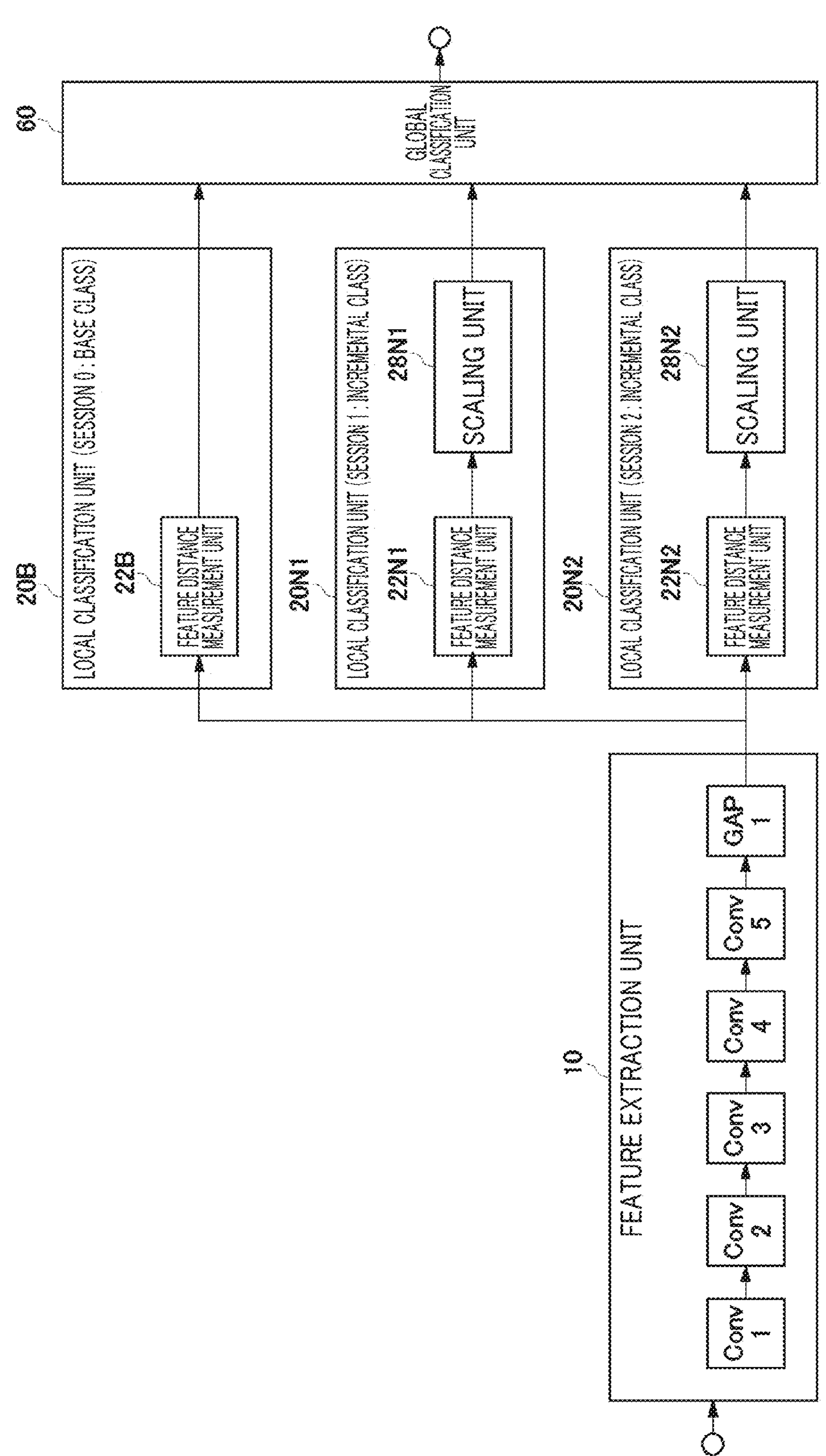
FIG. 8
10
FEATURE EXTRACTION UNIT
Conv 1
Conv 2
Conv 3
Conv 4
Conv 5
GAP 1
20B
LOCAL CLASSIFICATION UNIT (SESSION 0 : BASE CLASS)
22B
FEATURE DISTANCE MEASUREMENT UNIT
20N1
LOCAL CLASSIFICATION UNIT (SESSION 1 : INCREMENTAL CLASS)
22N1
FEATURE DISTANCE MEASUREMENT UNIT
28N1
SCALING UNIT
20N2
LOCAL CLASSIFICATION UNIT (SESSION 2 : INCREMENTAL CLASS)
22N2
FEATURE DISTANCE MEASUREMENT UNIT
28N2
SCALING UNIT
60
GLOBAL CLASSIFICATION UNIT 210
FEATURE EXTRACTION UNIT
Conv 1
Conv 2
Conv 3
Conv 4
Conv 5
GAP 1
GAP 2
220B
LOCAL CLASSIFICATION UNIT (SESSION 0 : BASE CLASS)
222Ba
GENERAL FEATURE DISTANCE MEASUREMENT UNIT
222Bb
DETAILED FEATURE DISTANCE MEASUREMENT UNIT
270a
GENERAL FEATURE LEARNING UNIT
270b
DETAILED FEATURE LEARNING UNIT

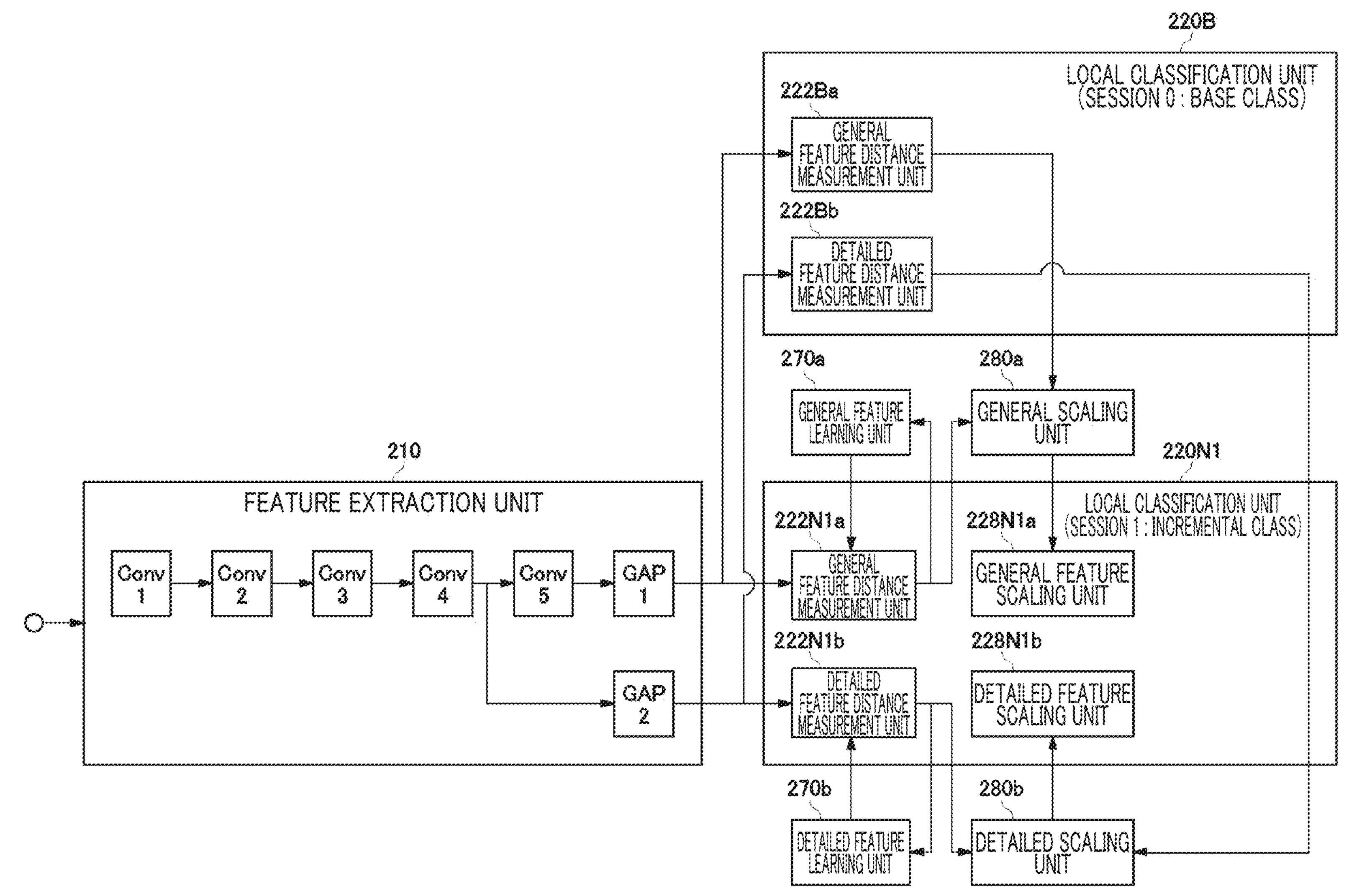
FIG. 15
210
FEATURE EXTRACTION UNIT
Conv 1
Conv 2
Conv 3
Conv 4
Conv 5
GAP 1
GAP 2
220B
LOCAL CLASSIFICATION UNIT (SESSION 0 : BASE CLASS)
222Ba
GENERAL FEATURE DISTANCE MEASUREMENT UNIT
222Bb
DETAILED FEATURE DISTANCE MEASUREMENT UNIT
270a
GENERAL FEATURE LEARNING UNIT
280a
GENERAL SCALING UNIT
220N1
LOCAL CLASSIFICATION UNIT (SESSION 1 : INCREMENTAL CLASS)
222N1a
GENERAL FEATURE DISTANCE MEASUREMENT UNIT
228N1a
GENERAL FEATURE SCALING UNIT
222N1b
DETAILED FEATURE DISTANCE MEASUREMENT UNIT
228N1b
DETAILED FEATURE SCALING UNIT
270b
DETAILED FEATURE LEARNING UNIT
280b
DETAILED SCALING UNIT

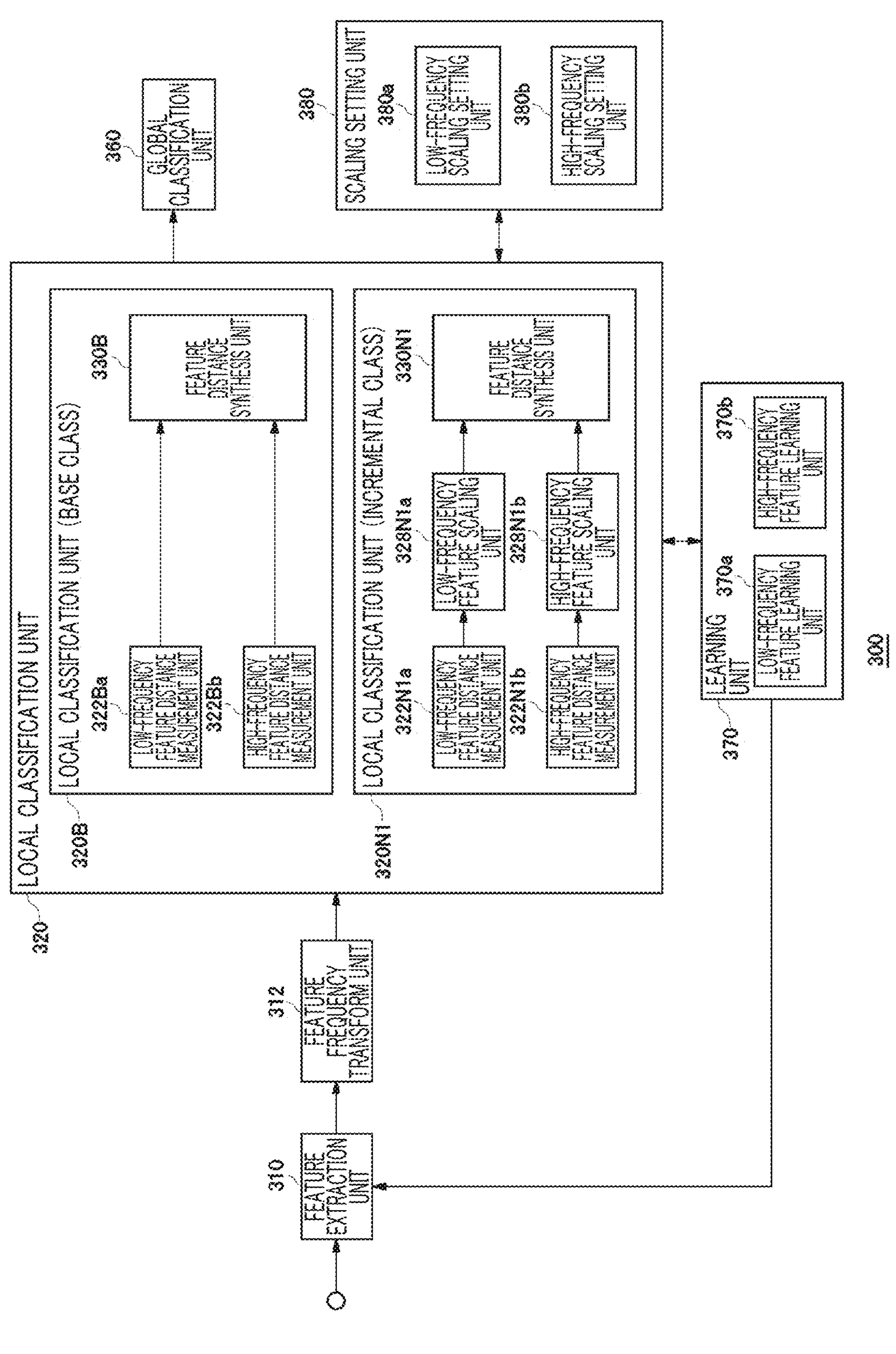
FIG. 17
310
FEATURE EXTRACTION UNIT
312
FEATURE FREQUENCY TRANSFORM UNIT
320
LOCAL CLASSIFICATION UNIT
320B
LOCAL CLASSIFICATION UNIT (BASE CLASS)
322Ba
LOW-FREQUENCY FEATURE DISTANCE MEASUREMENT UNIT
322Bb
HIGH-FREQUENCY FEATURE DISTANCE MEASUREMENT UNIT
330B
FEATURE DISTANCE SYNTHESIS UNIT
320N1
LOCAL CLASSIFICATION UNIT (INCREMENTAL CLASS)
322N1a
LOW-FREQUENCY FEATURE DISTANCE MEASUREMENT UNIT
322N1b
HIGH-FREQUENCY FEATURE DISTANCE MEASUREMENT UNIT
328N1a
LOW-FREQUENCY FEATURE SCALING UNIT
328N1b
HIGH-FREQUENCY FEATURE SCALING UNIT
330N1
FEATURE DISTANCE SYNTHESIS UNIT
360
GLOBAL CLASSIFICATION UNIT
380
SCALING SETTING UNIT
380a
LOW-FREQUENCY SCALING SETTING UNIT
380b
HIGH-FREQUENCY SCALING SETTING UNIT
370
LEARNING UNIT
370a
LOW-FREQUENCY FEATURE LEARNING UNIT
370b
HIGH-FREQUENCY FEATURE LEARNING UNIT
300

IMAGE CLASSIFICATION APPARATUS, IMAGE CLASSIFICATION METHOD, AND NON-TRANSITORY COMPUTER-READABLE MEDIUM HAVING IMAGE CLASSIFICATION PROGRAM

CROSS REFERENCE TO RELATED APPLICATION

This application is a continuation of application No. PCT/JP2023/002421, filed on Jan. 26, 2023, and claims the benefit of priority from the prior Japanese Patent Application No. 2022-011989, filed on Jan. 28, 2022, and the prior Japanese Patent Application No. 2022-011990, filed on Jan. 28, 2022, the entire content of which is incorporated herein by reference.

BACKGROUND

1. Technical Field

The present invention relates to image classification technology and image feature learning technology.

2. Description of the Related Art

Human beings can learn new knowledge through experiences over a long period of time and can maintain old knowledge without forgetting it. Meanwhile, the knowledge of a convolutional neutral network (CNN) depends on the dataset used in learning. To adapt to a change in data distribution, it is necessary to re-learn CNN parameters in response to the entirety of the dataset. In CNN, the precision estimation for old tasks will be decreased as new tasks are learned. Thus, catastrophic forgetting cannot be avoided in CNN. Namely, the result of learning old tasks is forgotten as new tasks are being learned in continual learning.

Incremental learning or continual learning is proposed as a scheme to avoid catastrophic forgetting. Continual learning is a learning method that improves a current trained model to learn new tasks and new data as they occur, instead of training the model from scratch.

Human beings can also learn new knowledge from a small number of images. On the other hand, artificial intelligence using deep learning that uses a convolutional neural network, etc., relies on big data (a large number of images) used for learning. It is known that, when artificial intelligence using deep learning is trained on a small number of images, it falls into overfitting characterized by good local performance but poor generalization performance.

Few shot learning has been proposed as a method to avoid overfitting. Few shot learning is a learning method that uses big data in a base task to learn basic knowledge, and then uses the basic knowledge to learn new knowledge from a small number of images in a new task.

Few shot class incremental learning is known as a method for solving the problems of both continuous learning and few shot learning (Non Patent Literature 1). Technology as one scheme of few shot learning is also known that uses a cosine distance between a feature vector and a weight vector (Non Patent Literature 2).

Non Patent Literature 1: Tao, Xiaoyu, et al. "Few-shot class-incremental learning." Proceedings of the IEEE/CVF Conference on Computer Vision and Pattern Recognition. 2020

Non Patent Literature 2: Chen, Wei-Yu, et al. "A closer look at few-shot classification." arXiv preprint arXiv: 1904.04232 (2019)

In the related art, there is a problem in that image classification accuracy is not sufficiently high in incremental learning or learning of a small number of images.

SUMMARY

In order to solve the aforementioned problems, an image classification apparatus according to an embodiment includes: a feature extraction unit that extracts a low-resolution general feature vector of an input image and a high-resolution detailed feature vector of the input image; a general feature distance measurement unit that maintains a general weight vector of each class and calculates a general distance vector from the general feature vector and the general weight vector; a detailed feature distance measurement unit that maintains a detailed weight vector of each class and calculates a detailed distance vector from the detailed feature vector and the detailed weight vector; a feature distance synthesis unit that calculates a synthesized distance vector by synthesizing the general distance vector and the detailed distance vector; and a classification unit that determines a class of the input image based on the synthesized distance vector.

Another embodiment also relates to an image classification apparatus. The apparatus includes: a feature extraction unit that extracts a feature vector of an input image; a feature frequency transform unit that transforms the feature vector into a frequency domain and generates a low-frequency feature vector and a high-frequency feature vector; a low-frequency feature distance measurement unit that maintains a low-frequency weight vector of each class and calculates a low-frequency distance vector from the low-frequency feature vector and the low-frequency weight vector; a high-frequency feature distance measurement unit that maintains a high-frequency weight vector of each class and calculates a high-frequency distance vector from the high-frequency feature vector and the high-frequency weight vector; a feature distance synthesis unit that calculates a synthesized distance vector by synthesizing the low-frequency distance vector and the high-frequency distance vector; and a classification unit that determines a class of the input image based on the synthesized distance vector.

Still another embodiment also relates to an image classification apparatus. The apparatus includes: a filter unit that transforms an input image into a frequency domain and divides the input image into a low-frequency component and a high-frequency component; a low-frequency feature extraction unit that extracts a low-frequency feature vector from the low-frequency component; a high-frequency feature extraction unit that extracts a high-frequency feature vector from the high-frequency component; a low-frequency feature distance measurement unit that maintains a low-frequency weight vector of each class and calculates a low-frequency distance vector from the low-frequency feature vector and the low-frequency weight vector; a high-frequency feature distance measurement unit that maintains a high-frequency weight vector of each class and calculates a high-frequency distance vector from the high-frequency feature vector and the high-frequency weight vector; a feature distance synthesis unit that calculates a synthesized distance vector by synthesizing the low-frequency distance vector and the high-frequency distance vector; and a classification unit that determines a class of the input image based on the synthesized distance vector.

Still another embodiment relates to an image classification method. The method includes: extracting a low-resolution general feature vector of an input image and a high-resolution detailed feature vector of the input image; maintaining a general weight vector of each class and calculating a general distance vector from the general feature vector and the general weight vector; maintaining a detailed weight vector of each class and calculating a detailed distance vector from the detailed feature vector and the detailed weight vector; calculating a synthesized distance vector by synthesizing the general distance vector and the detailed distance vector; and determining a class of the input image based on the synthesized distance vector.

An image classification apparatus according to an embodiment includes: a feature extraction unit that extracts a feature vector of an input image; a base class feature distance measurement unit that maintains a weight vector of a base class and calculates a distance vector of the base class from the feature vector and the weight vector of the base class; an incremental class feature distance measurement unit that maintains a weight vector of an incremental class and calculates a distance vector of the incremental class from the feature vector and the weight vector of the incremental class; a scaling unit that scales the distance vector of the incremental class by using a scaling value calculated based on the distance vector of the base class and the distance vector of the incremental class; and a classification unit that determines a class of the input image based on the distance vector of the base class and the scaled distance vector of the incremental class.

The feature extraction unit may extract a low-resolution general feature vector of the input image and a high-resolution detailed feature vector of the input image. The feature distance measurement unit of each class includes a general feature distance measurement unit that maintains a general weight vector of each class and calculates a general distance vector from the general feature vector and the general weight vector and a detailed feature distance measurement unit that maintains a detailed weight vector of each class and calculates a detailed distance vector from the detailed feature vector and the detailed weight vector.

The image classification apparatus may further include a feature frequency transform unit that transforms the feature vector into a frequency domain and generates a low-frequency feature vector and a high-frequency feature vector. The feature distance measurement unit of each class may include a low-frequency feature distance measurement unit that maintains a low-frequency weight vector of each class and calculates a low-frequency distance vector from the low-frequency feature vector and the low-frequency weight vector and a high-frequency feature distance measurement unit that maintains a high-frequency weight vector of each class and calculates a high-frequency distance vector from the high-frequency feature vector and the high-frequency weight vector.

The image classification apparatus may further include a filter unit that transforms the input image into a frequency domain and divides the input image into a low-frequency component and a high-frequency component. The feature extraction unit may include a low-frequency feature extraction unit that extracts a low-frequency feature vector from the low-frequency component and a high-frequency feature extraction unit that extracts a high-frequency feature vector from the high-frequency component, and the feature distance measurement unit of each class includes a low-frequency feature distance measurement unit that maintains a low-frequency weight vector of each class and calculates a low-frequency distance vector from the low-frequency feature vector and the low-frequency weight vector, and a high-frequency feature distance measurement unit that maintains a high-frequency weight vector of each class and calculates a high-frequency distance vector from the high-frequency feature vector and the high-frequency weight vector.

The image classification apparatus may further include a learning unit that trains the feature extraction unit and the base class feature distance measurement unit in response to an input image of a base class and trains the incremental class feature distance measurement unit in response to an input image of an incremental class in such a manner as to minimize a loss calculated from the distance vector and a correct class of the input image.

Another embodiment relates to an image classification method. The method includes: extracting a feature vector of an input image; maintaining a weight vector of a base class and calculating a distance vector of the base class from the feature vector and the weight vector of the base class; maintaining a weight vector of an incremental class and calculating a distance vector of the incremental class from the feature vector and the weight vector of the incremental class; scaling the distance vector of the incremental class by using a scaling value calculated based on the distance vector of the base class and the distance vector of the incremental class; and determining a class of the input image based on the distance vector of the base class and the scaled distance vector of the incremental class.

An image feature learning apparatus according to an embodiment includes: a feature extraction unit that extracts a low-resolution general feature vector of an input image and a high-resolution detailed feature vector of the input image; a general feature distance measurement unit that maintains a general weight vector of each class and calculates a general distance vector from the general feature vector and the general weight vector of each class; a detailed feature distance measurement unit that maintains a detailed weight vector of each class and calculates a detailed distance vector from the detailed feature vector and the detailed weight vector of each class; a general loss calculation unit that calculates a general loss from the general distance vector and a correct label of the input image; a detailed loss calculation unit that calculates a detailed loss from the detailed distance vector and a correct label of the input image; a loss weighting addition unit that configures a weight of the general loss to be greater than a weight of the detailed loss when weighting the general loss and the detailed loss and calculates a total loss by adding a weighted general loss and a weighted detailed loss; and an optimization unit that trains the feature extraction unit, the general feature distance measurement unit, and the detailed feature distance measurement unit based on the total loss.

Another embodiment relates to an image feature learning method. The method includes: extracting a low-resolution general feature vector of an input image and a high-resolution detailed feature vector of the input image; maintaining a general weight vector of each class and calculating a general distance vector from the general feature vector and the general weight vector of each class; maintaining a detailed weight vector of each class and calculating a detailed distance vector from the detailed feature vector and the detailed weight vector of each class; calculating a general loss from the general distance vector and a correct label of the input image; calculating a detailed loss from the detailed distance vector and a correct label of the input image; configuring a weight of the general loss to be greater than a weight of the detailed loss when weighting the general loss and the detailed loss and calculating a total loss by adding a weighted general loss and a weighted detailed loss; and training parameters in the extracting, the maintaining of the general weight vector and calculating of the general distance vector, and the maintaining of the detailed weight vector and calculating of the detailed distance vector, based on the total loss.

Optional combinations of the aforementioned constituting elements, and implementations of the embodiments in the form of methods, apparatuses, systems, recording mediums, and computer programs may also be practiced as incremental modes of the embodiments.

BRIEF DESCRIPTION OF THE DRAWINGS

The disclosure will be described with reference to the following drawings.

FIG. 1 is a configuration diagram of an image classification apparatus according to the first embodiment.

FIG. 8 is a diagram illustrating a detailed configuration of the image classification apparatus that makes a classification by predicting a class of an image included in the test data set.

FIG. 15 is a diagram illustrating a detailed configuration and operation of the image classification apparatus in incremental class learning.

FIG. 17 is a configuration diagram of an image classification apparatus according to the third embodiment.

DETAILED DESCRIPTION

Figure 2:
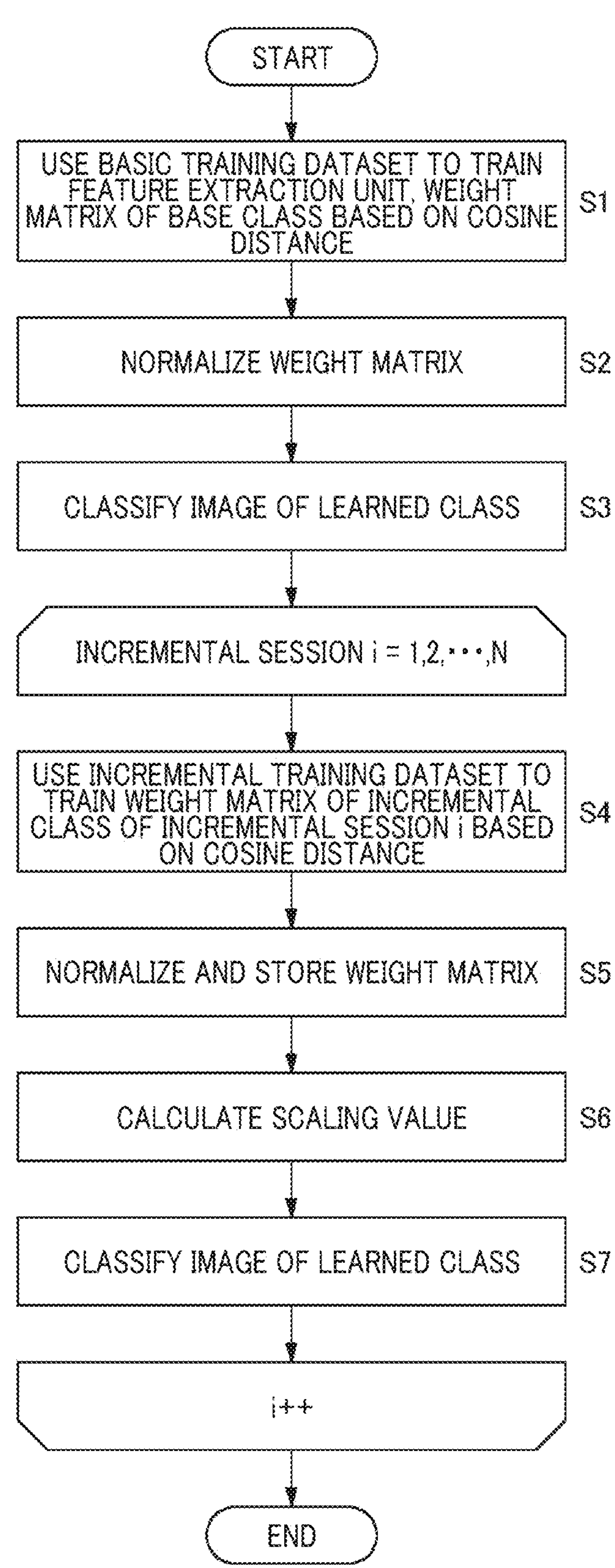
FIG. 2 is a flowchart illustrating an overall flow of learning by the image classification apparatus.

The invention will now be described by reference to the preferred embodiments. This does not intend to limit the scope of the present invention, but to exemplify the invention.

First Embodiment

FIG. 1 is a configuration diagram of an image classification apparatus 100 according to the first embodiment. The image classification apparatus 100 performs few shot class incremental learning that continually learns an incremental class comprised of a small number of training data items after leaning a base class comprised of a large number of training data items.

The image classification apparatus 100 includes a feature extraction unit 10, a local classification unit 20, a global classification unit 60, a learning unit 70, and a scaling setting unit 80.

The local classification unit 20 includes a base class local classification unit 20B for session 0 and incremental class local classification units 20N1, 20N2 for session 1, session 2.

The base class local classification unit 20B for session 0 includes a feature distance measurement unit 22B. The incremental class local classification units 20N1, 20N2 for session 1, session 2 include feature distance measurement units 22N1, 22N2 and scaling units 28N1, 28N2.

A description will be given here of a case in which the incremental class of session 1 and the incremental class of session 2 are learned after the base class of session 0 is learned, but the number of incremental classes is arbitrary.

FIG. 2 is a flowchart illustrating an overall flow of learning by the image classification apparatus 100. The configuration and operation of the image classification apparatus 100 will be described with reference to FIGS. 1 and 2.

The basic training dataset is a supervised dataset including a large number of base classes (e.g., about 100 to 1000 classes), wherein each class is comprised of a large number of images (e.g., 3000 images). The basic training dataset is assumed to have a sufficient amount of data to allow learning a general classification task alone.

On the other hand, the incremental training dataset is a supervised dataset including a small number of incremental classes (e.g., about 2 to 10 classes), wherein each incremental class is comprised of a small number of images (e.g., about 1 to 10 images). It is assumed here that the set includes a small number of images but may include a large number of images provided that the number of classes is small.

The test data set can include all classes in the base class and the incremental classes learned up to the incremental learning session, and can include images that are not included in the basic training data set and the incremental training data set. In addition, the test dataset is an unsupervised dataset in which each class is comprised of about 100 images. It is assumed here that each class is comprised of about 100 images, but each class may be comprised of any number of images. The test data set is a dataset to examine generalization performance and is also so-called production data.

In this case, the test data set is assumed to include all classes in the base class and the incremental classes learned up to the incremental learning session i, but the test data set may include only some of the base class and the incremental classes learned up to the incremental learning session.

The basic training data set is used to train the feature extraction unit 10 and the weight matrix of the base class based on the cosine distance (S1). The learning session i, where i=0, is assumed. This is also called the initial session.

When the feature extraction unit 10 and the weight matrix of the base class has been trained, the weight matrix of the base class is regularized (S2). As a result, the feature extraction unit 10 and the weight matrix of the base class that have been trained for actual use is obtained. The weight matrix of the feature extraction unit 10 and the base class that has been learned is not updated at the time of incremental learning. This normalization step may be provided at the end of base class learning shown in FIG. 4.

Images of the base class that are included in the test dataset and that have been learned are classified (S3). If the test dataset cannot be made available, the image data of classes that are included in the training dataset and that have been learned is classified. In the case base class classification is not necessary, this step need not be performed.

The continuous learning session i is repeated N times (i=1, 2, . . . , N).

The incremental training data set is used to train the weight matrix of the incremental class of the incremental session i, based on the cosine distance (S4).

When the training is completed, the trained weight matrix is regularized and stored (S5).

The scaling value of the incremental class of session i is calculated using the weight matrix of the base class of session 0 and the weight matrix of the incremental class of session i that are regularized (S6).

The base class and the incremental class that are included in the test dataset and that have been learned are classified (S7).

The image classification apparatus 100 increments i by 1, returns to step S4, repeats steps S4-S7 until i=N, and terminates the process when i exceeds N.

Figure 3:
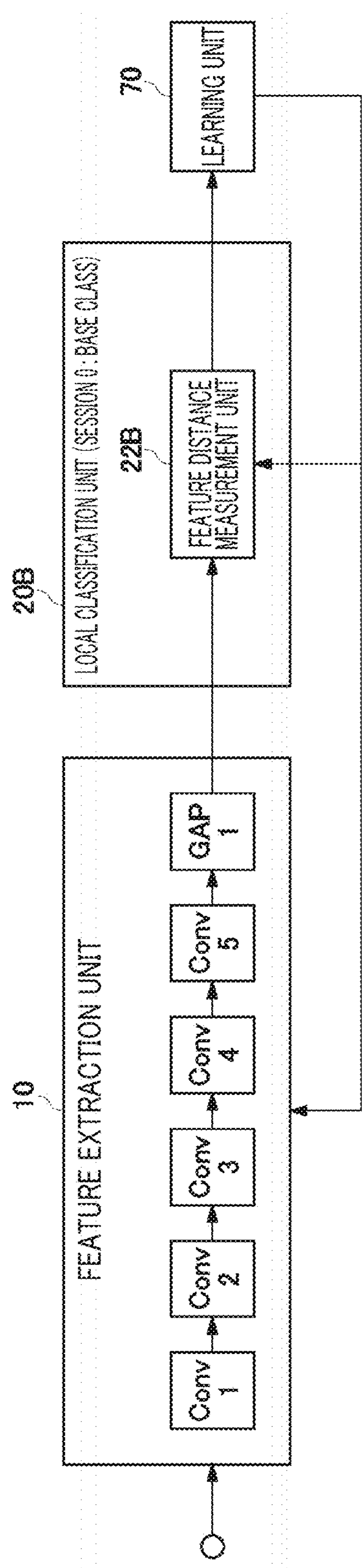
FIG. 3 is a diagram illustrating a detailed configuration of the image classification apparatus in base class learning.
Figure 4:
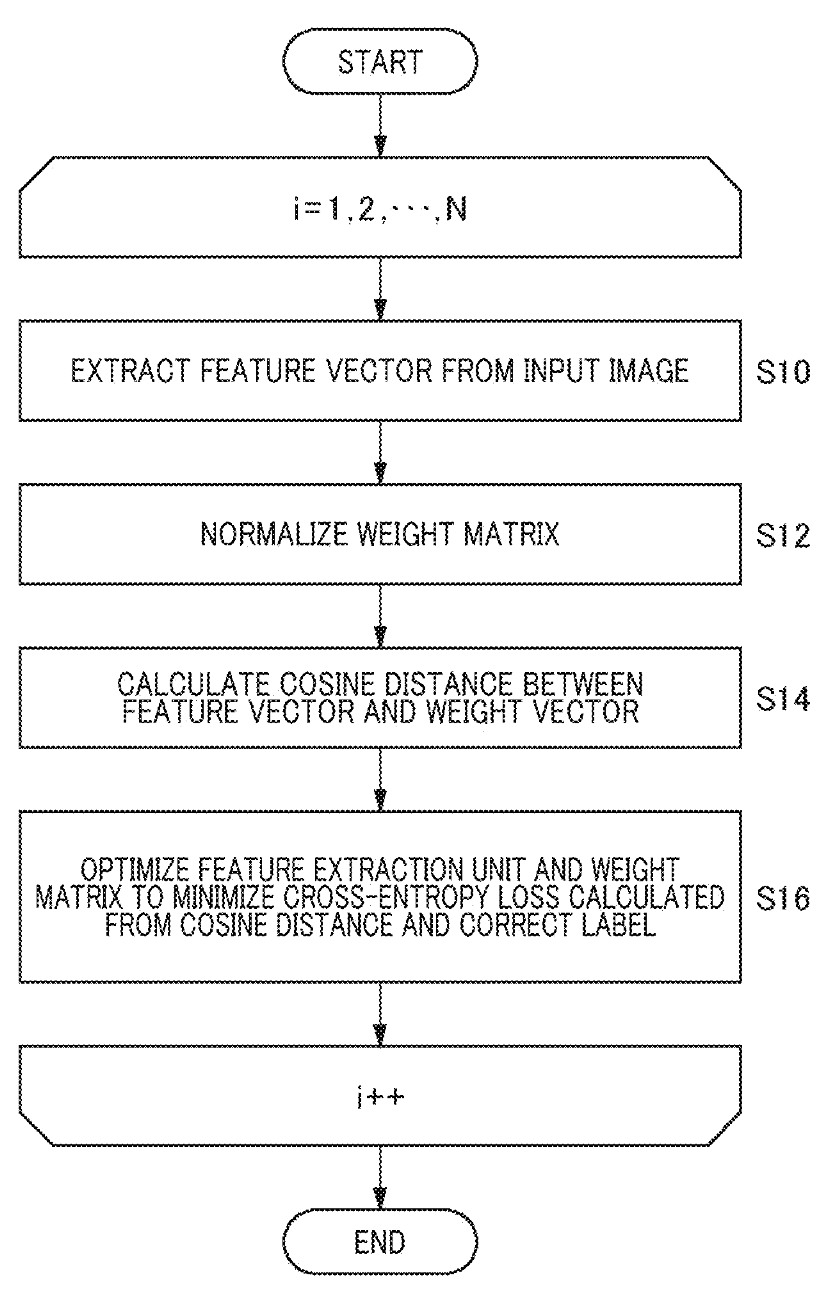
FIG. 4 is a flowchart illustrating a detailed operation of the image classification apparatus in base class learning.

The configuration and operation of the image classification apparatus 100 in base class learning shown in step S1 of FIG. 2 will be described in detail. FIG. 3 is a diagram illustrating a detailed configuration of the image classification apparatus 100 in base class learning. FIG. 4 is a flowchart illustrating a detailed operation of the image classification apparatus 100 in base class learning. Base class learning in session 0 by the image classification apparatus 100 will be described with reference to FIGS. 3 and 4.

Learning is performed N times in batch size units. For example, the batch size is 128, and learning (backpropagation) is repeated as many times as necessary for 400 epochs.

The feature extraction unit 10 includes CONV1 to CONV5, which are convolutional layers of ResNet-18, and GAP1 (Global Average Pooling). GAP converts the feature map output from the convolutional layer into a feature vector. A 7×7 512-channel feature map is input to GAP1, and a 512-dimension feature vector is output (S10).

The feature extraction unit 10 may be a deep learning network other than ResNet-18 such as VGG16 and ResNet-34, and the dimension of the feature vector may be other than 512 dimensions.

The feature vector output from GAP1 of the feature extraction unit 10 is input to the feature distance measurement unit 22B of the base class local classification unit 20B.

Since the feature distance measurement unit 22B of the base class local classification unit 20B and the feature distance measurement units 22N1, 22N2 of the incremental class local classification units 20N1, 20N2 have the same configuration, they are collectively referred to as the feature distance measurement unit 22 for the purpose of description.

Figure 5:
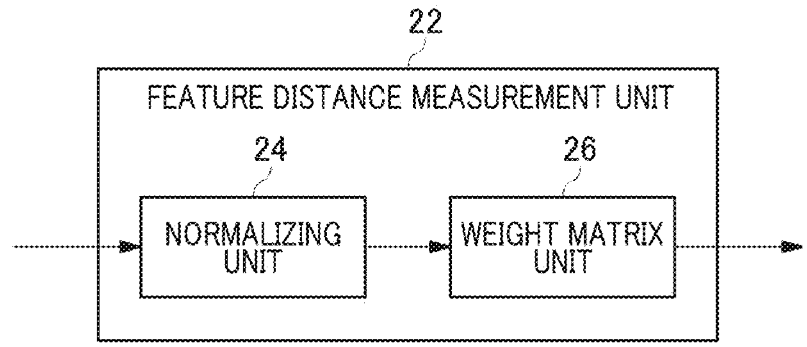
FIG. 5 is a configuration diagram of the feature distance measurement unit.

FIG. 5 is a configuration diagram of the feature distance measurement unit 22. The feature distance measurement unit 22 includes a regularizing unit 24 and a weight matrix unit 26.

The regularizing unit 24 normalizes the input feature vector by L2 regularization.

The weight matrix unit 26 has the weight of a linear layer (fully-connected layer). Each class in classification has a weight vector of 512 dimensions and a weight matrix of (512×NC) dimensions, where NC denotes the number of classes. NC may be a number equal to or greater than the number of classes.

The weight matrix is regularized (L2 regularized) by the Euclidean norm (S12).

The input feature vector is input to the regularizing unit 24 and is normalized, and the normalized feature vector is input to the weight matrix unit 26. The weight matrix unit 26 calculates and outputs a cosine distance vector of NC dimensions, which is a cosine distance (cosine similarity) between the feature vector and the weight vector of each class in classification (S14). Hereinafter, cosine distance is interchangeable with cosine similarity. By normalizing the feature vector and calculating a cosine distance, intraclass variance is suppressed and classification accuracy is improved.

For regularization of the weight, the method described in the following paper is used. Salimans, Tim, and Durk P. Kingma. "Weight normalization: A simple reparameterization to accelerate training of deep neural networks." Advances in neural information processing systems 29 (2016): 901-909.

The learning unit 70 calculates a cross-entropy loss, which is a loss defined between the cosine distance vector and the correct class (class to which a label is assigned) of the input image. The feature extraction unit 10 and the weight matrix of the linear layer of the feature distance measurement unit 22B are trained by backpropagation using an optimization method such as stochastic gradient descent (SGD) and Adam (S16) in such a manner as to minimize the cross-entropy loss.

Figure 6:
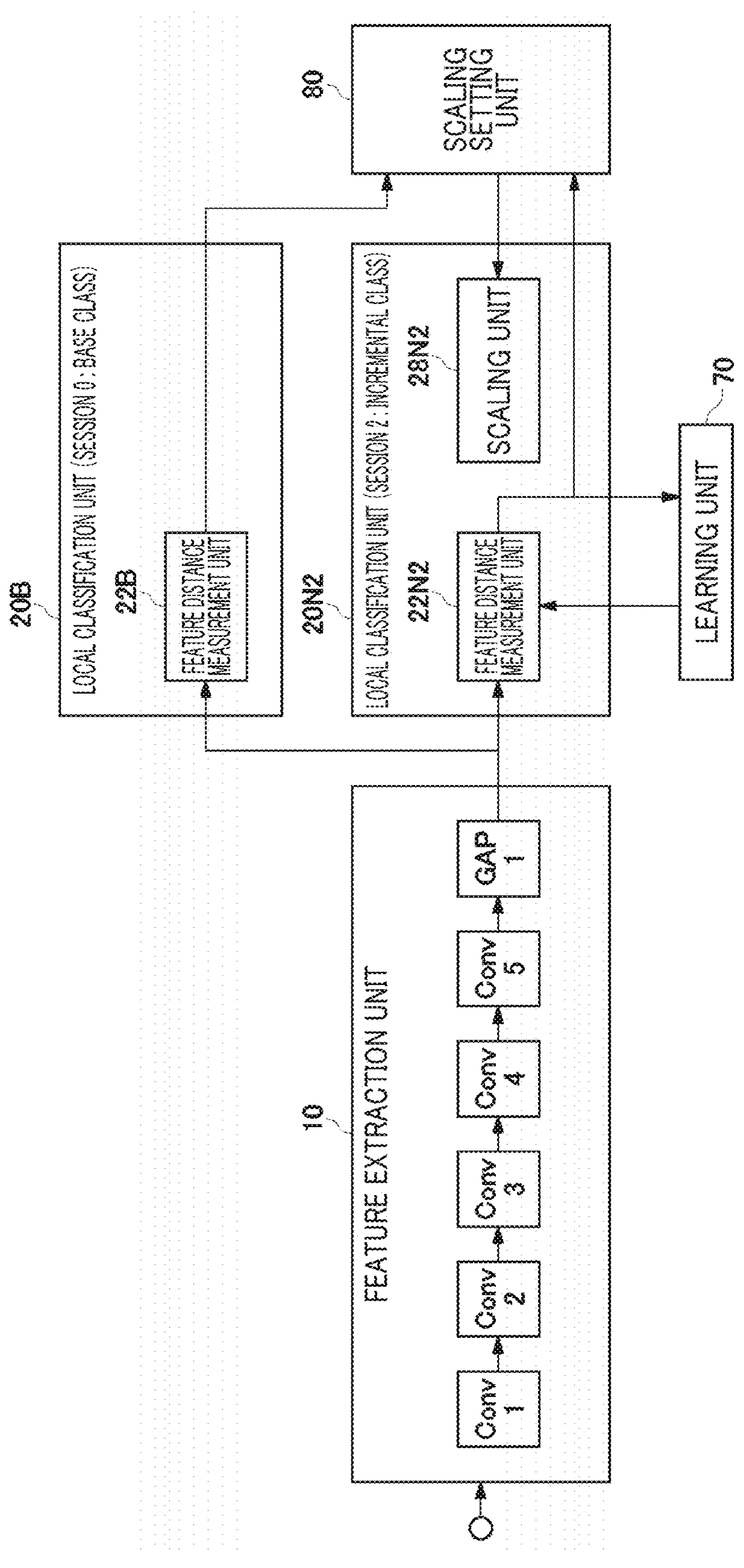
FIG. 6 is a diagram illustrating a detailed configuration of the image classification apparatus in incremental class learning.

FIG. 6 is a diagram illustrating a detailed configuration of the image classification apparatus 100 in incremental class learning. For convenience of explanation, it is assumed that the base class of session 0 and the incremental class of session 1 have been learned, and a case of learning the incremental class of session 2 will be described. However, the description also applies to learning of the incremental class in any session i=1, 2, . . . , N.

In incremental class learning, the feature extraction unit 10 is not trained. Further, when the incremental class of session 2 is learned, the base class local classification unit 20B of session 0 and the incremental class local classification unit 20N1 of session 1 are not trained. When the incremental class of session 2 is learned, only the incremental class local classification unit 20N2 of session 2 is trained.

Referring to FIG. 6, the detailed configuration and operation of each part of the image classification apparatus 100 in incremental class learning are substantially the same as the detailed configuration and operation of each part in base class learning except for the fact that the feature extraction unit 10 is not trained and the scaling value is calculated by using the output of the base class local classification unit 20B in session 0. Therefore, the difference will mainly be described.

The difference is that an incremental training dataset, which includes a small number of images in a small number of classes, is used. It is commonly referred to as few shot learning, and N-way/K-shot learning is performed, where N denotes the number of classes, and K denotes the number of images. In general, 5-way/5-shot, 5-way/1 shot, 10-way/5-shot, etc. are available.

Due to a small number of data items, the batch size in incremental class learning is smaller than that of base class learning. For example, the batch size in the incremental class is about N-way×M (M=1−K). The small number of data items is expanded by L times (for example, L=10) before learning.

The feature distance measurement unit 22N2 of the incremental class local classification unit 20N2 of session 2 maintains a weight matrix of the incremental class as the weight matrix, and the number of classes is the number of incremental classes.

The scaling unit 28N2 of the incremental class local classification unit 20N2 of session 2 maintains the scaling value input from the scaling setting unit 80.

At this point, however, the accuracy of classification by the local classification unit 20N2 in the local classification space of the incremental class is sufficient as far as the incremental class is concerned, but the accuracy of classification by the global classification unit 60 in the composite classification space combining the base class and the incremental class is insufficient.

Figure 7:
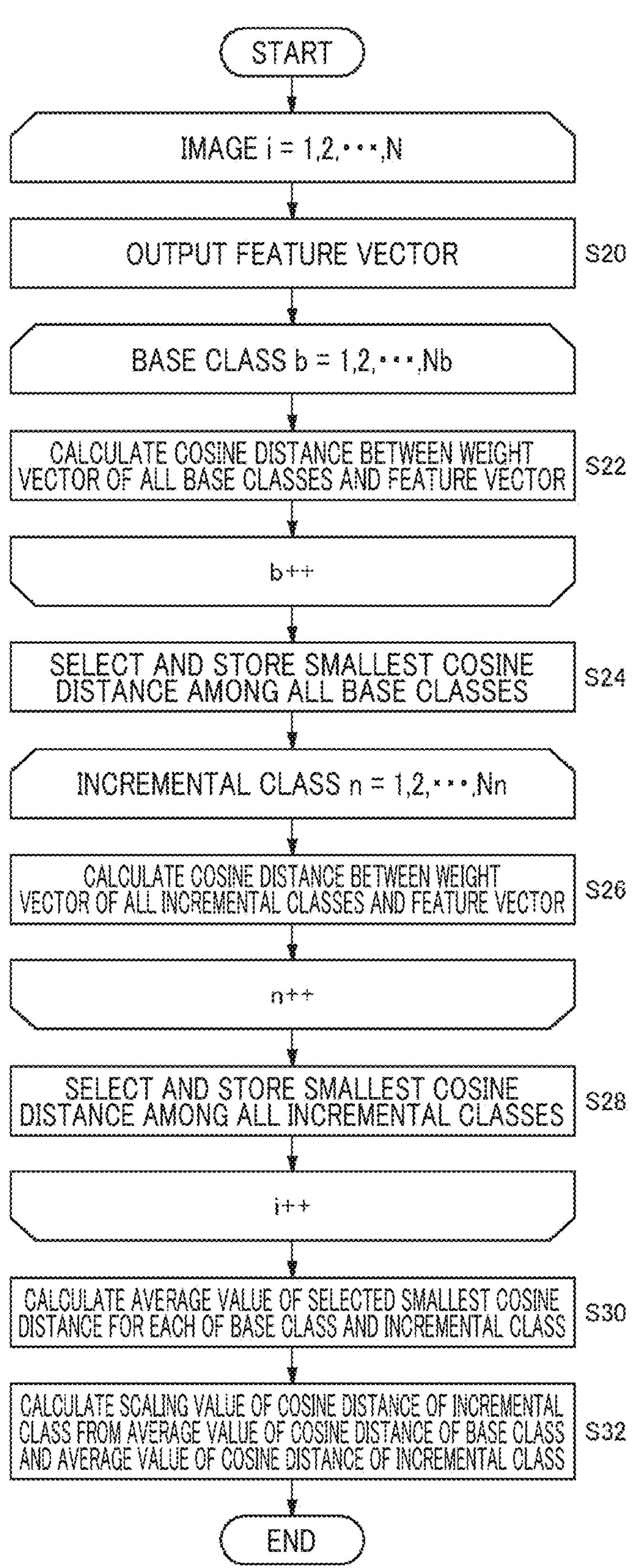
FIG. 7 is a flowchart showing steps of calculating the scaling value of an incremental class by the scaling setting unit.

FIG. 7 is a flowchart showing steps of calculating the scaling value of an incremental class by the scaling setting unit 80. Using the regularized weight matrix of the base class of session 0 and the regularized weight matrix of the incremental class of session 2, the scaling value α of the incremental class of session 2 is calculated.

The following definition is given.

N: Number of all images included in the incremental training dataset of session 2

Nb: Number of classes in the base class set

Nn: Number of incremental classes in session 2

Steps S20-S28 are performed in response to the i-th image (i=1, 2, . . . , N).

The feature extraction unit 10 outputs a feature vector (S20).

The base class feature distance measurement unit 22B of session 0 calculates the cosine distance between the weight vector of all base classes b (b=1, 2, . . . , Nb) and the feature vector (S22).

The scaling setting unit 80 selects and stores the smallest cosine distance among all base classes (S24).

The incremental class feature distance measurement unit 22N2 of session 2 calculates the cosine distance between the weight vector of all incremental classes n (n=1, 2, . . . , Nn) and the feature vector (S26).

The scaling setting unit 80 selects and stores the smallest cosine distance among all incremental classes (S28).

The image classification apparatus 100 increments i by 1, returns to step S20, repeats steps S20-S28 until i=N, and proceeds to step S30 when i exceeds N.

The scaling setting unit 80 calculates an average value of the selected smallest cosine distance, for each of the base class and the incremental class (S30).

The scaling setting unit 80 calculates the scaling value of the cosine distance of the incremental class from the average value of the cosine distance of the base class and the average value of the cosine distance of the incremental class (S32).

The steps of FIG. 7 are performed for all images included in the incremental training dataset of session 2. The calculation need not be limited to the steps of FIG. 7 provided that the average value of the cosine distance output by the base class local classification unit 20B of session 0 and the incremental class local classification unit 20N2 of session 2 can be calculated for all images included in the incremental training dataset of session 2.

The scaling value of the cosine distance of the incremental class is obtained by the following expression.

(the scaling value of the cosine distance of the incremental class)=(the average value of the cosine distance of the base class)/(the average value of the cosine distance of the incremental class)×γ where γ is a predetermined value. For example, γ=1.0 in this case. Increasing γ makes it more likely that the incremental class is selected, and decreasing γ makes it less likely the incremental class is selected. In this way, γ can be set according to the importance of the base class and the incremental class.

As described above, according to the image classification apparatus 100 of this embodiment, the scaling value calculated from the average value of the cosine distance of the base class and the average value of the cosine distance of the incremental class is determined and used in each session. Thereby, inconsistency between the cosine distance of the base class learned by using big data and that of the incremental class learned by using a small number of data items can be resolved, and the output level of the local classification unit can be adjusted. In addition, variation of the cosine distance between incremental sessions, in which variability of features tends to increase, can be suppressed by scaling the cosine distance of each incremental class with reference to the cosine distance of the base class. As a result, it is possible to make classification into the base class and the incremental class with high accuracy in the composite classification space without depending on the number of data items or learning condition of the base class and the incremental class. The average value of the cosine distance is used in this case, but other amounts of statistics that can show the characteristics of the cosine distance, such as median, maximum, minimum, and total values, may also be used.

In this embodiment, the scaling value calculated from the average value of the cosine distance of the base class and the average value of the cosine distance of the incremental class is used, but the scaling value may be a predetermined value. For example, the predetermined value is weighted according to the level of training of the weight matrix of the base class and the level of training of the weight matrix of the incremental class. The level of training is a ratio between the total number of images used to train the weight matrix of the base class and the total number of images used to train the weight matrix of the incremental class. The larger the total number of images used to train the weight matrix of the base class as compared to the total number of images used to train the weight matrix of the incremental class, the larger the predetermined value is configured to be.

FIG. 8 is a diagram illustrating a detailed configuration of the image classification apparatus 100 that makes a classification by predicting a class of an image included in the test data set. In this case, a description will be given of a case in which the base class of session 0, the incremental class of session 1, and the incremental class of session 2 have been learned. A scaling unit is not provided in the base class local classification unit 20B in this case to simplify the explanation, but a scaling unit may be provided in the local classification unit 20B as well.

The image input to the feature extraction unit 10 is processed by each convolutional layer, and the feature vector output from GAP1 is input to the feature distance measurement unit 22B of the base class local classification unit 20B, and the feature distance measurement units 22N1, 22N2 of the incremental class local classification units 20N1, 20N2.

The feature distance measurement units 22B, 22N1, 22N2 calculate the cosine distance between the weight vector and the feature vector input from GAP1, and calculate the cosine distance vector of a dimension determined by the number of classes.

The base class feature distance measurement unit 22B of session 0 outputs the cosine distance vector to the global classification unit 60.

The incremental class feature distance measurement units 22N1, 22N2 of session 1, session 2 output the cosine distance vectors calculated respectively to the scaling units 28N1, 28N2.

The incremental class scaling units 28N1, 28N2 of session 1, session 2 scale the cosine distance input from the feature distance measurement units 22N1, 22N2 according to the respective scaling value and output the result to the global classification unit 60.

The global classification unit 60 selects a class having the largest cosine similarity (that is, the shortest cosine distance) by referring to the cosine distance vectors of the base class of session 0, the incremental class of session 1, and the incremental class of session 2, and outputs the determined class.

As described above, according to the image classification apparatus 100 of this embodiment, the class learned in the past is prevented from being forgotten by storing the regularized weight matrix of all classes in the base class and the incremental classes.

In addition, images can be easily classified simply by comparing the feature vector of the input image with the weight vector of each class.

Further, the scaling value calculated from the average value of the cosine distance of the base class and the average value of the cosine distance of the incremental class is applied to the cosine distance of the incremental class. Thereby, the level of the cosine distance of the base class learned by using big data and that of the incremental class learned by using a small number of data items can be adjusted to each other. This makes it possible to make accurate base class and incremental class classification in the synthetic classification space.

Second Embodiment

Figure 9:
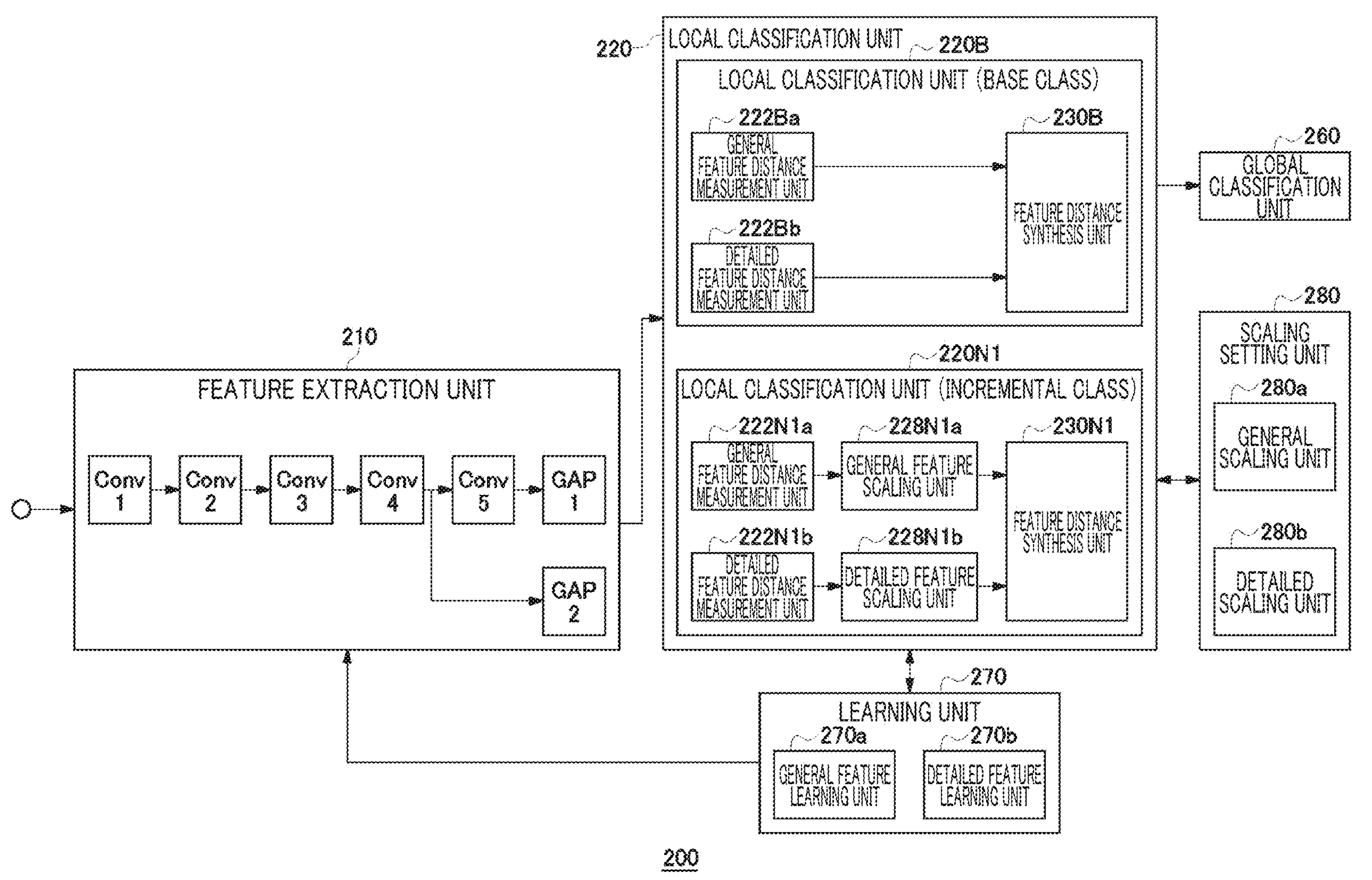
FIG. 9 is a configuration diagram of an image classification apparatus according to the second embodiment.

FIG. 9 is a configuration diagram of an image classification apparatus 200 according to the second embodiment. A description of the configuration and operation common to those of the first embodiment will be omitted as appropriate.

The image classification apparatus 200 includes a feature extraction unit 210, a local classification unit 220, a global classification unit 260, a learning unit 270, and a scaling setting unit 280.

Feature vectors of a plurality of resolutions are output from the feature extraction unit 210. In this case, a low-resolution general feature vector and a high-resolution detailed feature vector are mentioned as examples of feature vectors of a plurality of resolutions.

The local classification unit 20 includes a base class local classification unit 220B of session 0 and an incremental class local classification unit 220N1 of session 1.

The base class local classification unit 220B of session 0 includes a general feature distance measurement unit 222Ba, a detailed feature distance measurement unit 222Bb, and a feature distance synthesis unit 230B. The incremental class local classification unit 220N1 of session 1 includes a general feature distance measurement unit 222N1*a*, a detailed feature distance measurement unit 222N1*b*, a general feature scaling unit 228N1*a*, a detailed feature scaling unit 228N1*b*, and a feature distance synthesis unit 230N1.

A description will be given here of a case in which the incremental class of session 1 is learned after the base class of session 0 is learned, but the number of incremental classes is arbitrary.

The learning unit 270 includes a general feature learning unit 270*a* and a detailed feature learning unit 270*b*.

The scaling setting unit 280 includes a general scaling setting unit 280*a* and a detailed scaling setting unit 280*b*.

Figure 10:
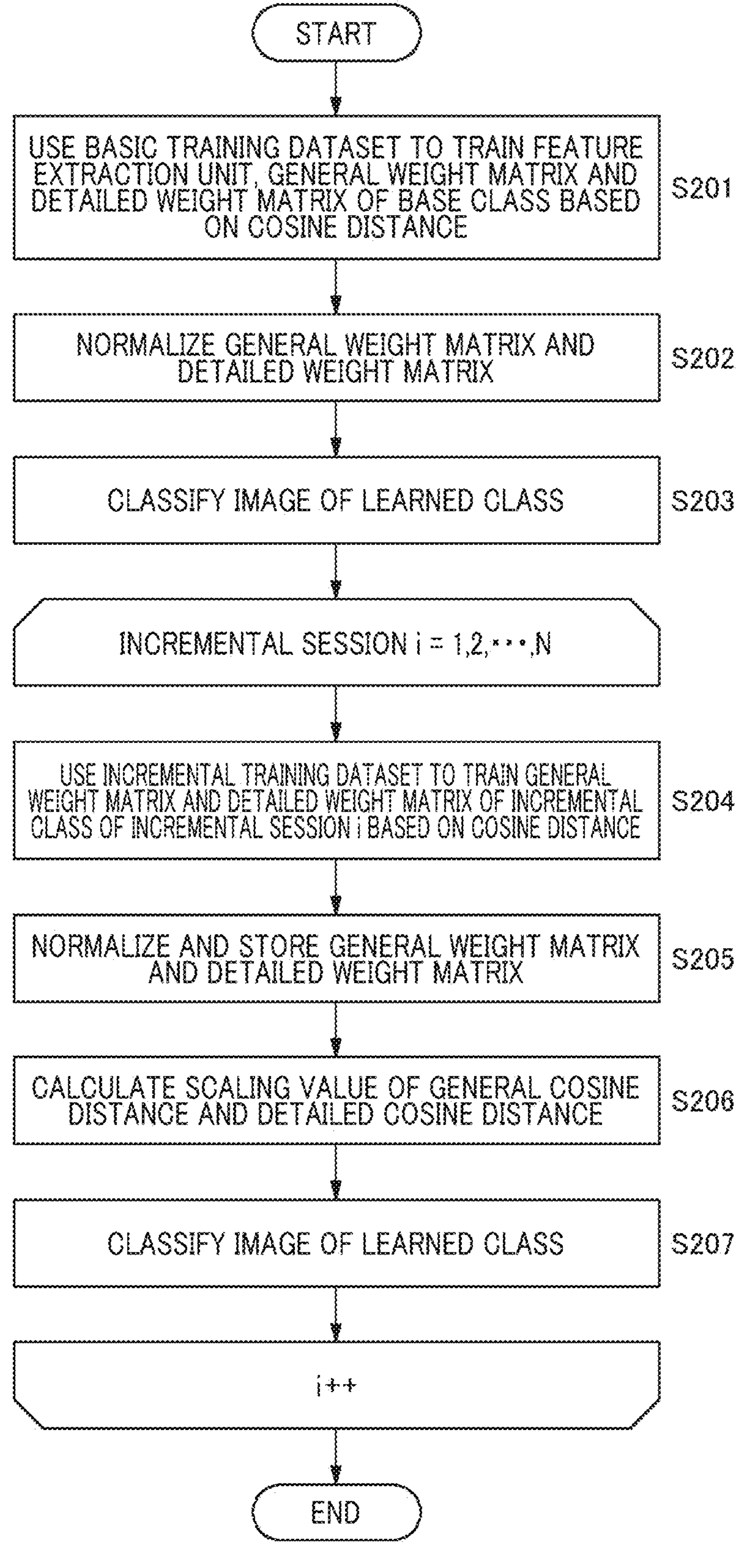
FIG. 10 is a flowchart illustrating an overall flow of learning by the image classification apparatus.

FIG. 10 is a flowchart illustrating an overall flow of learning by the image classification apparatus 200. The configuration and operation of the image classification apparatus 200 will be described with reference to FIGS. 9 and 10.

The basic training data set is used to train the feature extraction unit 210 and the general weight matrix and the detailed weight matrix of the base class based on the cosine distance (S201). The learning session i, where i=0 is assumed. This is also called the initial session.

When the feature extraction unit 10 and the general weight matrix and the detailed weight matrix of the base class have been learned, the general weight matrix and the detailed weight matrix of the base class are regularized (S202). As a result, the feature extraction unit 210 and the general weight matrix and detailed weight matrix of the base class that have been trained for actual use are obtained. The feature extraction unit 10 and the general weight matrix and detailed weight matrix of the base class that have been learned are not updated at the time of incremental learning. This normalization step may be provided at the end of base class learning shown in FIG. 12.

Images of the base class that are included in the test dataset and that have been learned are classified (S203). If the test dataset cannot be made available, the image data of classes that are included in the training dataset and that have been learned is classified.

The continuous learning session i is then repeated N times (i=1, 2, . . . , N).

The incremental training data set is used to train the general weight matrix and the detailed weight matrix of the incremental class of the incremental session i, based on the cosine distance (S204).

When the training is completed, the general weight matrix and the detailed weight matrix that have been trained are regularized and stored (S205).

The scaling value of the general cosine distance and the detailed cosine distance is calculated (S206).

The base class and the incremental classes that are included in the test dataset and that have been learned are classified (S207).

The image classification apparatus 200 increments i by 1, returns to step S14, repeats steps S24-S27 until i=N, and terminates the process when i exceeds N.

Figure 11:
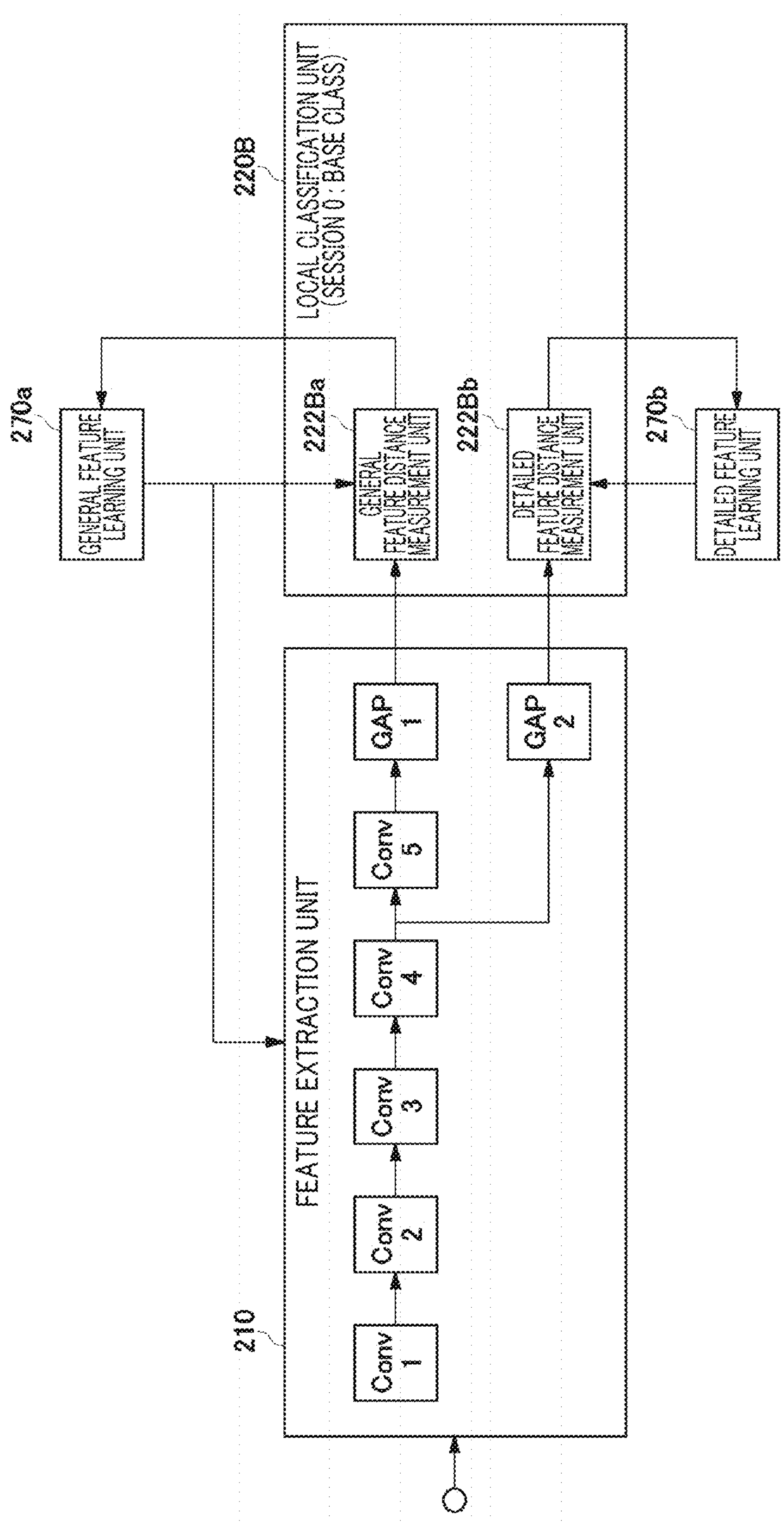
FIG. 11 is a diagram illustrating a detailed configuration of the image classification apparatus in base class learning.
Figure 12:
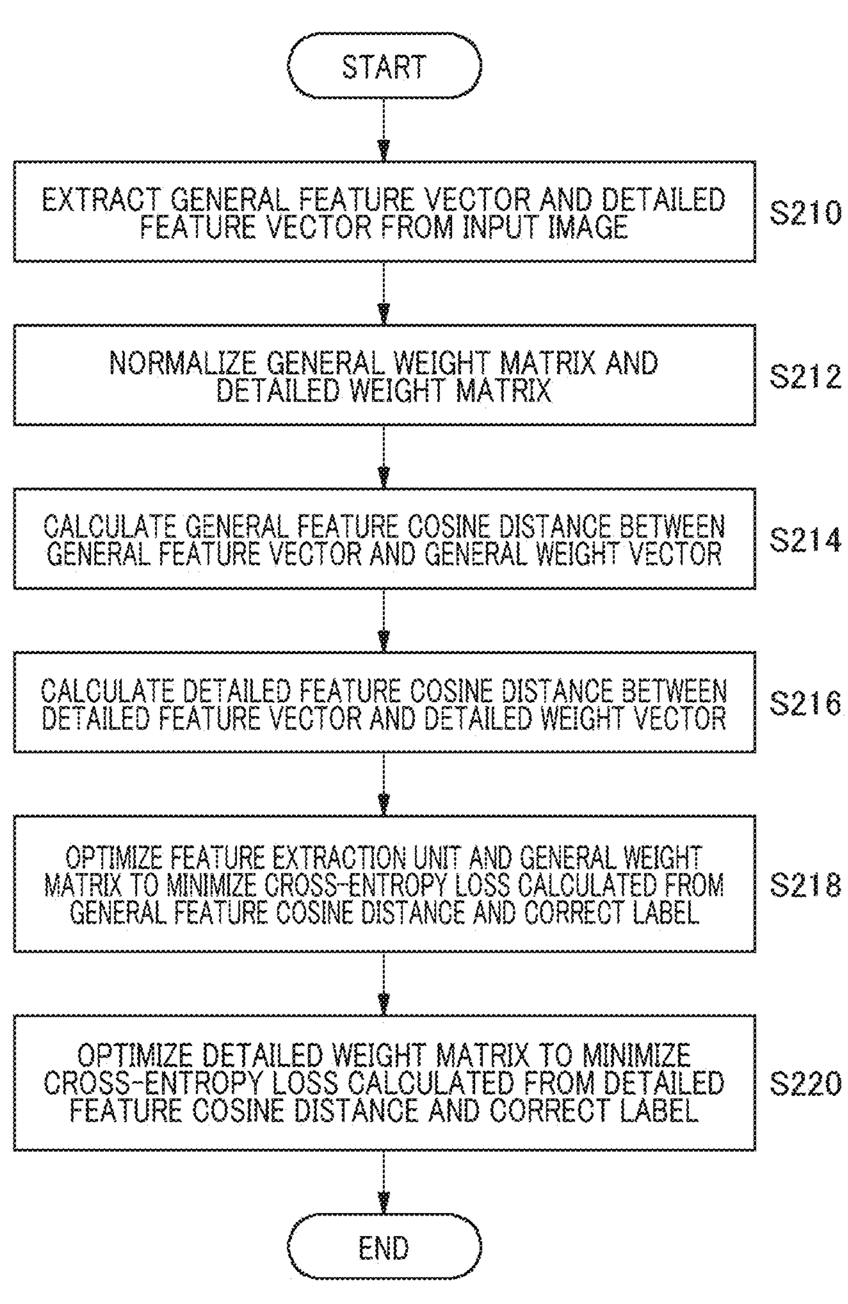
FIG. 12 is a flowchart illustrating a detailed operation of the image classification apparatus in base class learning.

The configuration and operation of the image classification apparatus 200 in base class learning shown in step S201 of FIG. 10 will be described in detail. FIG. 11 is a diagram illustrating a detailed configuration of the image classification apparatus 200 in base class learning. FIG. 12 is a flowchart illustrating a detailed operation of the image classification apparatus 200 in base class learning. Base class learning in session 0 by the image classification apparatus 200 will be described with reference to FIGS. 11 and 12.

The basic operation is the same as that of the first embodiment. The second embodiment differs from the first embodiment in that GAP2 is added to the feature extraction unit 210, a detailed feature distance measurement unit 222Bb is added to the base class local classification unit 220B, and a detailed feature learning unit 270*b* is added to the learning unit 270. The detailed feature learning unit 270*b* trains only the detailed feature distance measurement unit 222Bb. In this case, the general feature learning unit 270*a* is caused to train the feature extraction unit 210 and the general feature distance measurement unit 222Ba, and the detailed feature learning unit 270*b* is caused to train the detailed feature distance measurement unit 222Bb. Alternatively, the general feature learning unit 270*a* may be caused to train the general feature distance measurement unit 222Ba, and the detailed feature learning unit 270*b* may be caused to train the feature extraction unit 210 and the detailed feature distance measurement unit 222Bb. Alternatively, the general feature learning unit 270*a* may be caused to train the feature extraction unit 210 and the general feature distance measurement unit 222Ba, and the detailed feature learning unit 270*b* may be caused to train the feature extraction unit 210 and the detailed feature distance measurement unit 222Bb.

The feature extraction unit 10 includes CONV1 to CONV5, which are convolutional layers of ResNet-18, and GAP1 and GAP2. GAP converts the feature map output from the convolutional layer into a feature vector. A 7×7 512-channel feature map is input to GAP1, and a 512-dimension feature vector is output. The output of CONV4 is input to GAP2. A 14×14 256-channel feature map is input to GAP2, and a 256-dimension detailed feature vector is output (S210).

The feature extraction unit 210 may be a deep learning network other than ResNet-18 such as VGG16 and ResNet-34, and the dimensions of the feature vector may be comprised a combination other than 512 dimensions and 256 dimensions. Further, the feature map input to GAP2 may be from a convolutional layer other than CONV4 such as CONV3 and CONV2. There may be three or more GAPs.

The general feature vector output from GAP1 of the feature extraction unit 210 is output to the general feature distance measurement unit 222Ba of the base class local classification unit 220B, and the detailed feature vector output from GAP2 of the feature extraction unit 210 is output to the detailed feature distance measurement unit 222Bb of the base class local classification unit 220B.

Since the general feature distance measurement unit 222Ba of the base class local classification unit 220B and the general feature distance measurement units 222Na, 222N2*a* of the incremental class local classification units 220N1, 220N2 have the same configuration, they are collectively referred to as the general feature distance measurement unit 222*a* for the purpose of description. Since the detailed feature distance measurement unit 222Bb of the base class local classification unit 220B and the detailed feature distance measurement units 222N1*b*, 222N2*b* of the incremental class local classification units 220N1, 220N2 have the same configuration, they are collectively referred to as the detailed feature distance measurement unit 222*b* for the purpose of description.

The configuration of the general feature distance measurement unit 222*a* and the detailed feature distance measurement unit 222*b* is the same as the configuration of the feature distance measurement unit 22 of the first embodiment shown in FIG. 5 and includes a regularizing unit and a weight matrix unit.

The normalizing unit of the general feature distance measurement unit 222*a* normalizes the input general feature vector by L2 regularization. The weight matrix unit of the general feature distance measurement unit 222*a* includes a linear layer, has a 512-dimension general weight vector for each class, and has a (512×NC)-dimension general weight matrix (NC is the number of classes). The general weight matrix is regularized (L2 regularized) by the Euclidean norm (S212).

The normalizing unit of the detailed feature distance measurement unit 222*b* normalizes the input detailed feature vector by L2 regularization. The weight matrix unit of the detailed feature distance measurement unit 222*b* includes a linear layer, has a 512-dimension detailed weight vector for each class, and has a (512×NC)-dimension detailed weight matrix. The detailed weight matrix is regularized (L2 regularized) in the Euclidean norm (S212).

The input general feature vector is input to the regularizing unit of the general feature distance measurement unit 222*a* and is normalized, and the normalized general feature vector is input to the weight matrix unit of the general feature distance measurement unit 222*a*. The weight matrix unit of the general feature distance measurement unit 222*a* calculates and outputs a general cosine distance vector of NC dimensions, which is a cosine distance (cosine similarity) between the general feature vector and the general weight vector of each class (S214).

The input detailed feature vector is input to the regularizing unit of the detailed feature distance measurement unit 222*b* and is normalized, and the normalized detailed feature vector is input to the weight matrix unit of the detailed feature distance measurement unit 222*b*. The weight matrix unit of the detailed feature distance measurement unit 222*b* calculates and outputs a detailed cosine distance vector of NC dimensions, which is a cosine distance (cosine similarity) between the detailed feature vector and the detail weight vector of each class (S216).

The general feature learning unit 270*a* calculates a cross-entropy loss, which is a loss defined between the general cosine distance vector and the correct class (class to which a label is assigned) of the input image, and optimizes the feature extraction unit 210 and the general weight matrix in such a manner as to minimize the cross-entropy loss (S218).

The detailed feature learning unit 270*b* calculates a cross-entropy loss, which is a loss defined between the detailed cosine distance vector and the correct class (class to which a label is assigned) of the input image, and optimizes the detailed weight matrix in such a manner as to minimize the cross-entropy loss (S220).

Figure 13:
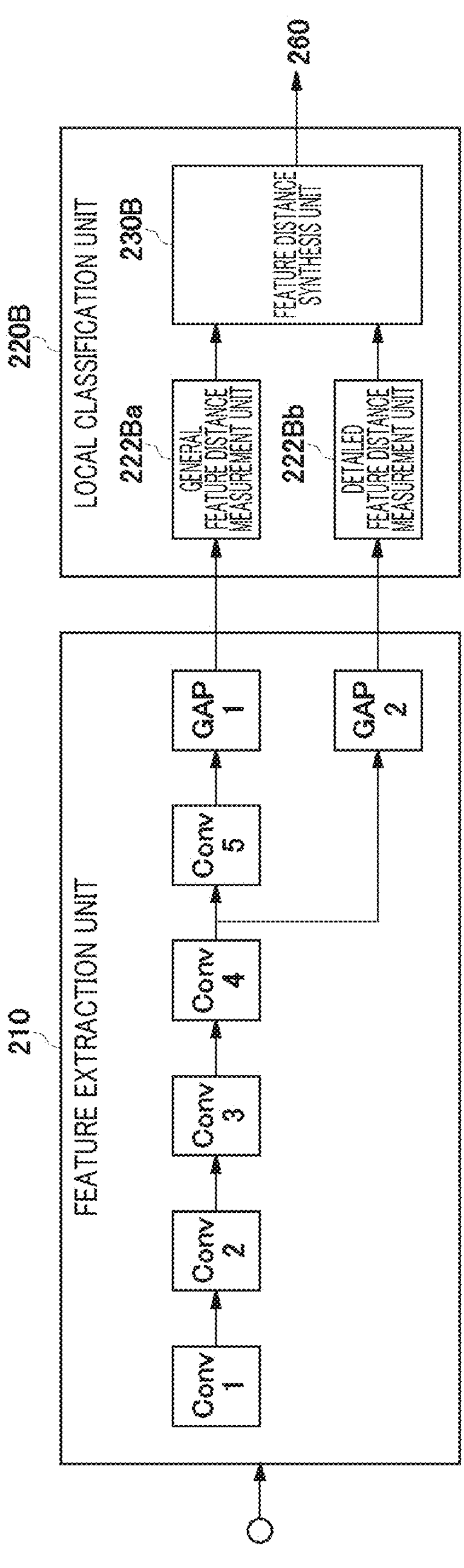
FIG. 13 is a diagram illustrating a detailed configuration of the image classification apparatus in base class classification.
Figure 14:
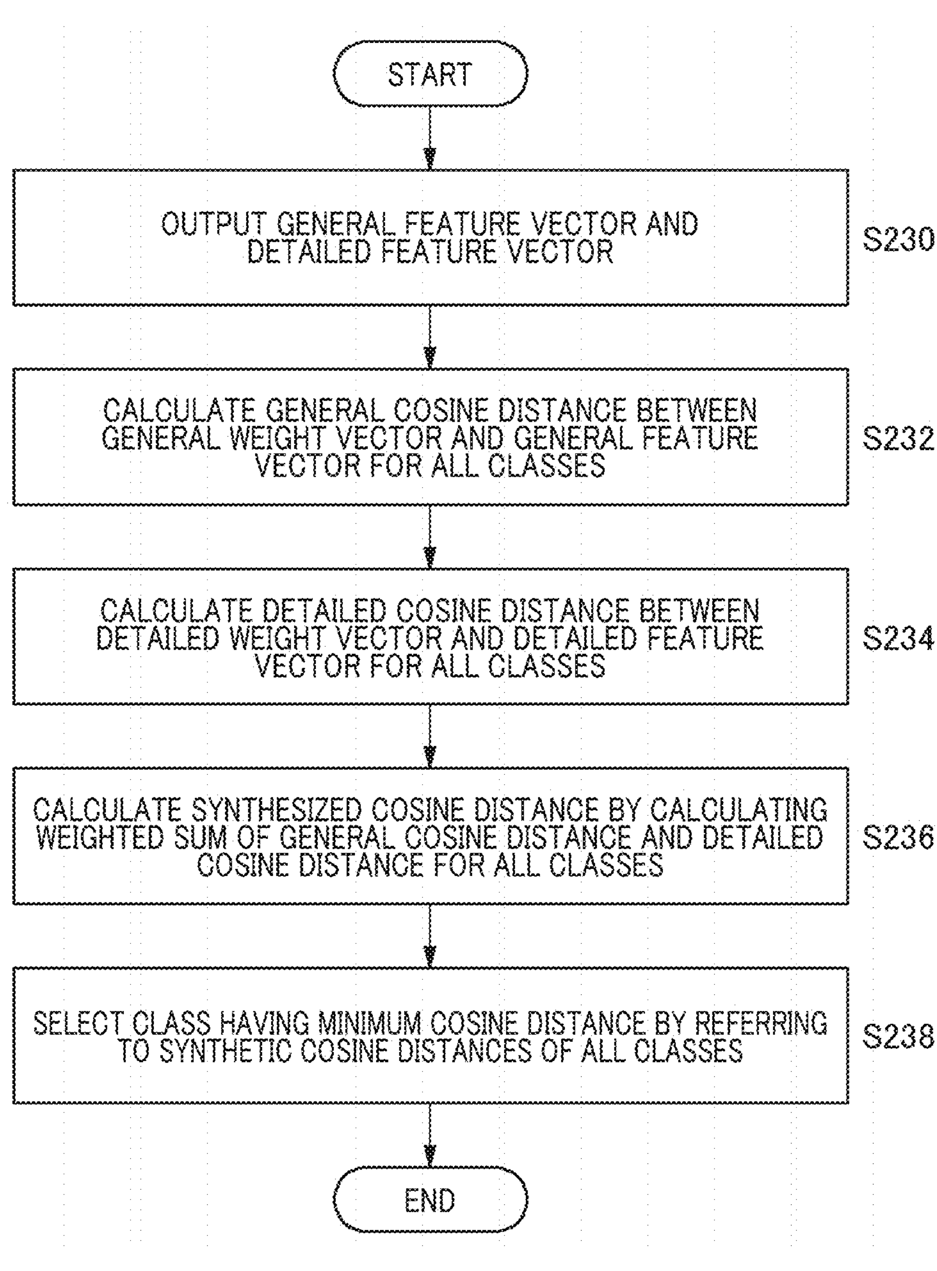
FIG. 14 is a flowchart illustrating a detailed operation of the image classification apparatus in base class classification.

FIG. 13 is a diagram illustrating a detailed configuration of the image classification apparatus 200 in base class classification. FIG. 14 is a flowchart illustrating a detailed operation of the image classification apparatus 200 in base class classification. Base class classification by the image classification apparatus 200 will be described with reference to FIGS. 13 and 14.

A general feature vector is output from GAP1 of the feature extraction unit 210, and a detailed feature vector is output from GAP2 (S230).

The general feature distance measurement unit 222Ba calculates and outputs a general cosine distance of NC dimensions, which is a cosine distance between the general feature vector and the general weight vector of each class (S232).

The detailed feature distance measurement unit 222Bb calculates and outputs a detailed cosine distance of NC dimensions, which is a cosine distance between the detailed feature vector and the detail weight vector of each class (S234).

The feature distance synthesis unit 230B calculates a synthesized cosine distance vector of NC dimensions by adding the general cosine distance vector Da and the detailed cosine distance vector Db (S236). The feature distance synthesis unit 230B outputs the synthesized cosine distance vector to the global classification unit 260.

In this case, the general cosine distance vector Da and the detailed cosine distance vector Db are simply added, but a weighted sum thereof may be determined as given by the following expression. It is assumed that a weighting parameter α is a predetermined value from 0 to 1. In this case, α is assumed to be 0.7.

$$Dc = \alpha Da + (1 - \alpha)\,Db.$$

The weighting parameter α can also be changed according to the position of the feature map that serves as the input to GAP2. For example, the closer to GAP1 the position of the feature map input to GAP2, the smaller α is configured to be, and the farther from GAP1 the position of the feature map input to GAP2, the larger α is configured to be.

The global classification unit 260 selects a class having the shortest cosine distance by referring to the synthetic cosine distances of the respective classes, and outputs the determined class (S238).

FIG. 15 is a diagram illustrating a detailed configuration and operation of the image classification apparatus 200 in incremental class learning. For convenience of explanation, it is assumed that the base class of session 0 has been learned, and a case of learning the incremental class of session 1 will be described. However, the description also applies to learning of the incremental class in any session i=1, 2, . . . , N.

In incremental class training, the feature extraction unit 210 is not trained. Further, when the incremental class of session 1 is learned, the base class local classification unit 220B of session 0 is not trained. When the incremental class of session 1 is learned, only the incremental class local classification unit 220N1 of session 1 is trained.

Except for the fact that the feature extraction unit 210 is not trained, the detailed configuration and operation of incremental class learning are the same as the detailed configuration and operation of base class learning. Further, the basic configuration and operation of incremental class learning of the second embodiment are the same as those of the first embodiment except for a division into general and detailed. Only the differences will be described here.

The general scaling setting unit 280*a* calculates the scaling value of the general cosine distance of the incremental class of session 1 from the average value of the general cosine distance of the base class output from the base class general feature distance measurement unit 222Ba of session 0 and the average value of the general cosine distance of the incremental class output from the incremental class general feature distance measurement unit 222N1*a* of session 1. The general scaling setting unit 280*a* outputs the calculated scaling value to the incremental class general feature scaling unit 228N1*a* of session 1.

The detailed scaling setting unit 280*b* calculates the scaling value of the detailed cosine distance of the incremental class of session 1 from the average value of the detailed cosine distance of the base class output from the base class detailed feature distance measurement unit 222Bb of session 0 and the average value of the detailed cosine distance of the incremental class output from the incremental class detailed feature distance measurement unit 222N1*b* of session 1. The detailed scaling setting unit 280*b* outputs the calculated scaling value to the incremental class detailed feature scaling unit 228N1*b* of session 1.

The scaling value of the general cosine distance of the incremental class, the scaling value of the detailed cosine distance of the incremental class are given by the following expression.

(the scaling value of the general cosine distance of the incremental class)=(the average value of the general cosine distance of the base class)/(the average value of the general cosine distance of the incremental class)×γa (the scaling value of the detailed cosine distance of the incremental class)=(the average value of the detailed cosine distance of the base class)/(the average value of the detailed cosine distance of the incremental class)×γb where γa and γb are predetermined values. γa and γb may be the same value or different values. When γb is larger than γa, the incremental class is selected to prioritize the detailed feature, and, when γb is smaller than γa, the incremental class is selected to prioritize the general feature. For example, the incremental class is selected to prioritize the detailed feature by setting γa=1.0, γb=1.1, and the incremental class is selected to prioritize the general feature by setting γa=1.1, γb=1.0. Further, the general feature and the detailed feature can be handled equally by setting γa=γb=1.0.

Figure 16:
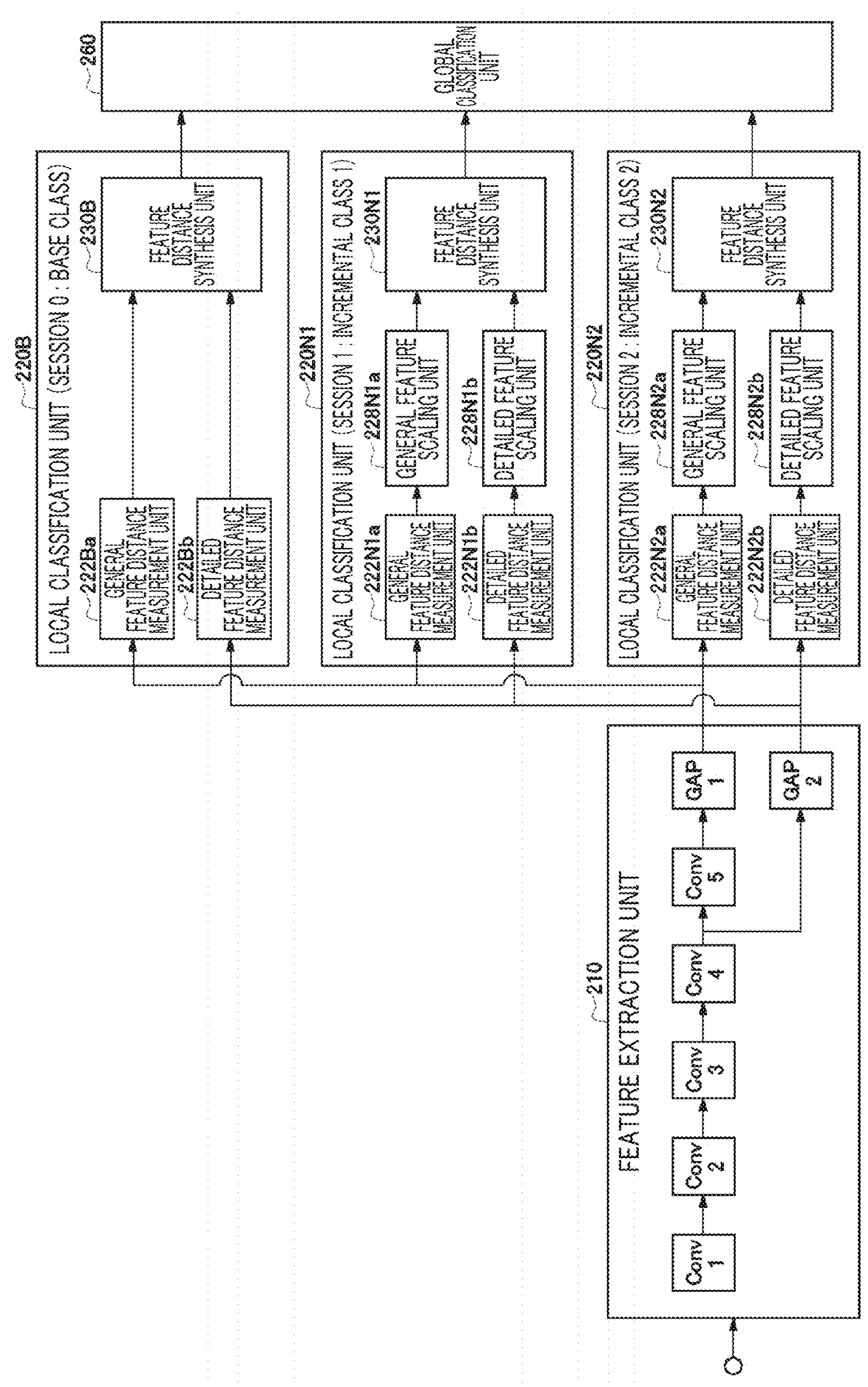
FIG. 16 is a diagram illustrating a detailed configuration of the image classification apparatus that makes a classification by predicting a class of an image included in a test data set.

FIG. 16 is a diagram illustrating a detailed configuration of the image classification apparatus 200 that makes a classification by predicting a class of an image included in a test data set. In this case, a description will be given of a case in which in which the base class of session 0, the incremental class of session 1, and the incremental class of session 2 have been learned.

The image input to the feature extraction unit 210 is processed by each convolutional layer, and the general feature vector output from GAP1 is input to the general feature distance measurement unit 222B of the base class local classification unit 220B of session 0, and the general feature distance measurement units 222N1*a*, 222N2*a* of the incremental class local classification units 220N1, 220N2 of session 1, session 2.

The detailed feature vector output from GAP2 is input to the detailed feature distance measurement unit 222Bb of the base class local classification unit 220B of session 0, and the detailed feature distance measurement units 222N1*b*, 222N2*b* of the incremental class local classification units 220N1, 220N2 of session 1, session 2.

The general feature distance measurement units 222Ba, 222N1*a*, 222N2*a* calculate the general cosine distance between the general weight vector and the general feature vector input from GAP1, and calculate the cosine distance vector of NC dimensions.

The detailed feature distance measurement units 222Bb, 222N1*b*, 222N2*b* calculate the detailed cosine distance between the detailed weight vector and the detailed feature vector input from GAP2, and calculate the cosine distance vector of NC dimensions.

The base class feature distance synthesis unit 230B of session 0 calculates a synthesized cosine distance vector by calculating a sum or a weighted sum of the general cosine distance vector and the detailed cosine distance vector, and outputs the synthesized cosine distance vector to the global classification unit 260.

The incremental class general feature distance measurement units 222N1*a*, 222N2*a* of session 1, session 2 output the general cosine distance vectors calculated respectively to the general feature scaling units 228N1*a*, 228N2*a*.

The incremental class detailed feature distance measurement units 222N1*b*, 222N2*b* of session 1, session 2 output the detailed cosine distance vectors calculated respectively to the detailed feature scaling units 228N1*b*, 228N2*b*.

The incremental class general feature scaling units 228N1*a*, 228N2*a* of session 1, session 2 scale the general cosine distance input from the general feature distance measurement units 222N1*a*, 222N2*a* according to the respective scaling values and output the result to the feature distance synthesis units 230N1, 230N2.

The incremental class detailed feature scaling units 228N1*b*, 228N2*b* of session 1, session 2 scale the detailed cosine distance input from the detailed feature distance measurement units 222N1*b*, 222N2*b* according to the respective scaling values and output the result to the feature distance synthesis units 230N1, 230N2.

The additional class feature distance synthesis unit 230N1, 230N2 of session 1, session 2 calculate a synthesized cosine distance vector by respectively calculating a sum or a weighted sum of the general cosine distance vector and the detailed cosine distance vector, and output the synthesized cosine distance vector to the global classification unit 260.

The global classification unit 260 selects a class having the largest cosine similarity (that is, the shortest cosine distance) by referring to the synthesized cosine distance vectors of the base class of session 0, the incremental class of session 1, and the incremental class of session 2, and outputs the determined class.

As described above, according to the image classification apparatus 200 of this embodiment, the class learned in the past is prevented from being forgotten by storing the regularized general weight matrix and the regularized detailed weight matrix of all classes in the base class and the incremental classes.

In addition, images can be easily classified simply by comparing the feature vector of the input image with the weight vector of each class.

Further, both the general feature (idealized feature) and the detailed feature (specific feature) of the input image can be individually evaluated and classified according to the cosine distance by using both the general weight matrix and the detailed weight matrix. It is thus possible to perform more accurate classification in the incremental session i. In some classes, the accuracy is improved by using a more idealized feature. In others, the accuracy is improved by using a more specific feature. The benefit is particularly enjoyed by using the detailed feature when it is difficult to perform classification merely by using the general feature.

Further, intraclass variance is suppressed more successfully even in the incremental class comprised of a small number of data items and characterized by a large variance of the feature, by calculating, for the general feature and the detailed feature individually, the scaling value from the average value of the cosine distance of the base class and the average value of the cosine distance of the incremental class. This makes it possible to make accurate base class and incremental class classification in the synthetic classification space.

In this embodiment, the general feature distance measurement unit stores all general weight matrices of the base class and the incremental class, and the detailed feature distance measurement unit stores all the detailed weight matrices of the base class and the incremental class to support few shot class incremental learning.

In few-shot learning, the general feature distance measurement unit and the detailed feature distance measurement unit need not store the weight matrices of the base class and incremental class and need only maintain the feature extraction unit for the next learning session. It is also possible for the feature distance synthesis unit to set the scaling value α of the base class and the scaling value α of the incremental class to different values.

Further, the general feature distance measurement unit and the detailed feature distance measurement unit may store the weight matrix of the base class and may not store the weight matrix of the incremental class to support a technology called generalized few shot learning that extends few shot class learning.

In the second embodiment, the scaling value, which is calculated from the average value of the cosine distance of the base class and the average value of the cosine distance of the incremental class, is calculated and used in each session to resolve inconsistency between the cosine distance of the base class learned by using big data and that of the incremental class learned by using a small number of data items. Thereby, the output level of the local classification unit is adjusted. In a variation of the second embodiment, the configuration for scaling may be omitted from the second embodiment.

Third Embodiment

FIG. 17 is a configuration diagram of an image classification apparatus 300 according to the third embodiment. A description of the configuration common to that of the second embodiment will be omitted as appropriate.

The image classification apparatus 300 includes a feature extraction unit 310, a feature frequency transform unit 312, a local classification unit 320, a global classification unit 360, a learning unit 370, and a scaling setting unit 380.

In the second embodiment, the feature extraction unit 210 generates the general feature vector and the detailed feature vector as examples of feature vectors of a plurality of resolutions. The third embodiment differs in that the feature frequency transform unit 312 subjects the feature vector output by the feature extraction unit 310 to frequency transform to generate a low-frequency feature vector and a high-frequency feature vector.

The local classification unit 320 includes a base class local classification unit 320B of session 0 and an incremental class local classification unit 320N1 of session 1.

The base class local classification unit 320B of session 0 includes a low-frequency feature distance measurement unit 322Ba, a high-frequency feature distance measurement unit 322Bb, and a feature distance synthesis unit 330B. The incremental class local classification unit 320N1 of session 1 includes a low-frequency feature distance measurement unit 322N1*a*, a high-frequency feature distance measurement unit 322N1*b*, a low-frequency feature scaling unit 328N1*a*, a high-frequency feature scaling unit 328N1*b*, and a feature distance synthesis unit 330N1.

The learning unit 370 includes a low-frequency feature learning unit 370*a* and a high-frequency feature learning unit 370*b*.

The scaling setting unit 380 includes a low frequency scaling setting unit 380*a* and a high frequency scaling setting unit 380*b*.

Hereinafter, the symbol "B" indicating the base class of session 0, the symbols "N1", "N2" indicating the incremental class of session 1, session 2 are omitted in order to describe the configuration without distinguishing between the base class and the incremental class.

The configuration of the feature extraction unit 310 is the same as the configuration of the feature extraction unit 10 of the first embodiment.

The feature frequency transform unit 312 applies two-dimension DCT (discrete cosine transform) to each 7×7 feature map, transforms the feature amount into the frequency domain to divide the feature amount into two frequency ranges, i.e., the low frequency range and the high frequency range, unidimensionalizes the low-frequency feature amount to generate a low-frequency feature vector, and unidimensionalizes the high-frequency feature amount to generate a high-frequency feature vector.

Figure 18B:
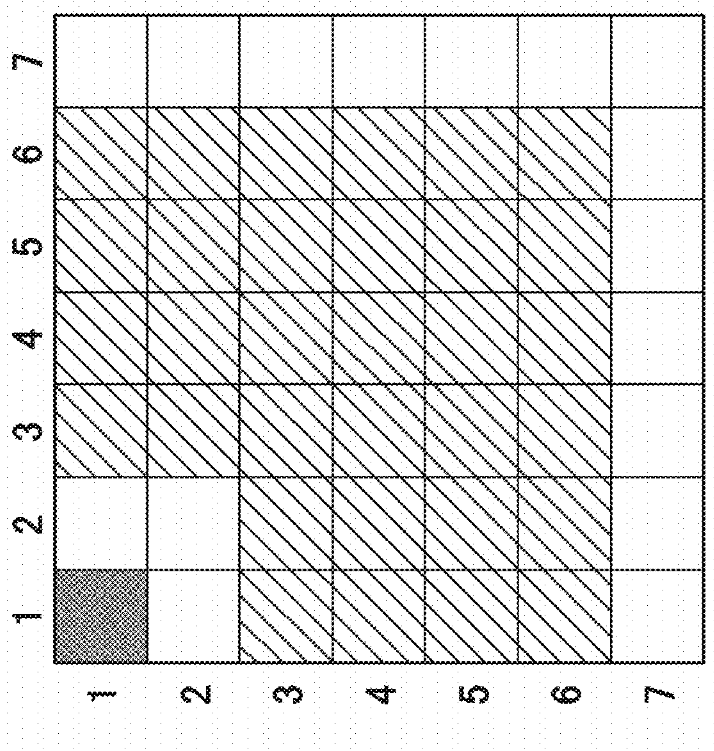
FIGS. 18A and 18B are diagrams illustrating an example of division into two frequency ranges, i.e., the low-frequency range and the high-frequency range.
Figure 18A:
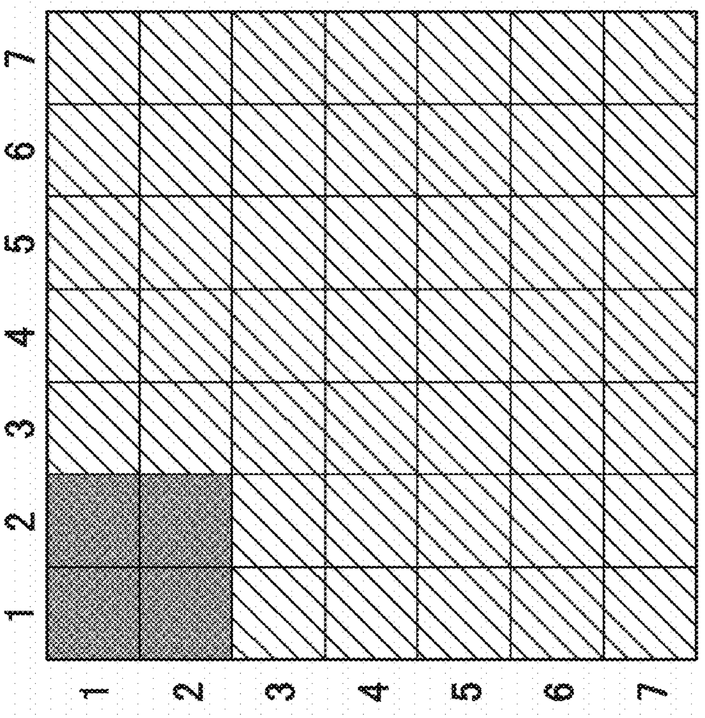

FIGS. 18A and 18B are diagrams illustrating examples of division into two frequency ranges, i.e., the low-frequency range and the high-frequency range. The low-frequency range is the filled area, and the high-frequency range is the area with diagonal lines. In the case of FIG. 18A, the feature frequency transform unit 312 generates a 2048-dimension low-frequency feature vector by unidimensionalizing the low-frequency feature amount, and generates a 25088-dimension high-frequency feature vector by unidimensionalizing the high-frequency amount.

As shown in FIG. 18B, the low-frequency range may be the DC component, and it is not necessary to include all frequency components in the low-frequency range and the high-frequency range. Further, the low-frequency range may be extended toward the high-frequency side. Further, two-dimension FFT (Fourier transform) may be used instead of two-dimension DCTs so long as division into the low-frequency range and the high-frequency range can be made.

The feature frequency transform unit 312 supplies the low-frequency feature vector to the low-frequency feature distance measurement unit 322*a* of the local classification unit 320, and supplies the high-frequency feature vector to the high-frequency feature distance measurement unit 322*b* of the local classification unit 320.

The low frequency feature distance measurement unit 322*a* includes a linear layer having a weight determined by the number of classes NC. The linear layer has, by way of example, a low-frequency weight vector of 2048 dimensions for each class and a low-frequency weight matrix of (2048×NC) dimensions. The low-frequency feature distance measurement unit 322*a* inputs the low-frequency feature vector normalized by L2 regularization to the linear layer, and calculates a low-frequency cosine distance vector of NC dimensions, which is a cosine distance (cosine similarity) between the low-frequency feature vector and the low-frequency weight vector of each class.

The high-frequency feature distance measurement unit 322*b* includes a linear layer having a weight determined by the number of classes. The linear layer has, by way of example, a 25088-dimension high-frequency weight vector for each class and a (25088×NC)-dimension high-frequency weight matrix. The high-frequency feature distance measurement unit 322*b* inputs a high-frequency feature vector normalized by L2 regularization to the linear layer, and calculates a high-frequency cosine distance vector of NC dimensions, which is a cosine distance (cosine similarity) between the high-frequency feature vector and the high-frequency weight vector of each class.

A description of the remaining features and of the subsequent process will be omitted because "general feature vector" and "detailed feature vector" of the second embodiment are merely replaced by "low frequency feature vector" and "high frequency feature vector" in the third embodiment.

As described above, according to the image classification apparatus 300 of this embodiment, the cosine distance (cosine similarity) of the feature vector of a plurality of frequency components output from the feature frequency transform unit 312 to the weight vector of the class that has been learned is calculated, and the cosine distances at respective resolutions with suppressed intraclass variance are synthesized. Thereby, evaluation can be made according to the similarity in both the low—the frequency component and the high-frequency component so that classification can be made with higher accuracy than in the case of using the cosine distance calculated from the single feature vector and the weight vector of the class that has been learned.

Further, the low-frequency component and the high-frequency component are also interpreted as a feature average component and a feature edge component, respectively. In other words, using the features of both the low-frequency component and high-frequency component makes more accurate classification possible by using both the average feature and the geometric feature of the input image for classification.

Further, the class learned in the past is prevented from being forgotten by storing the regularized low-frequency matrix and high-frequency weight of all classes in the base class and the incremental classes.

Further, using both the low-frequency weight matrix and the high-frequency weight matrix makes more accurate classification possible in the incremental session as well by evaluating both the average feature and the geometric feature of the input image for classification.

Fourth Embodiment

Figure 19:
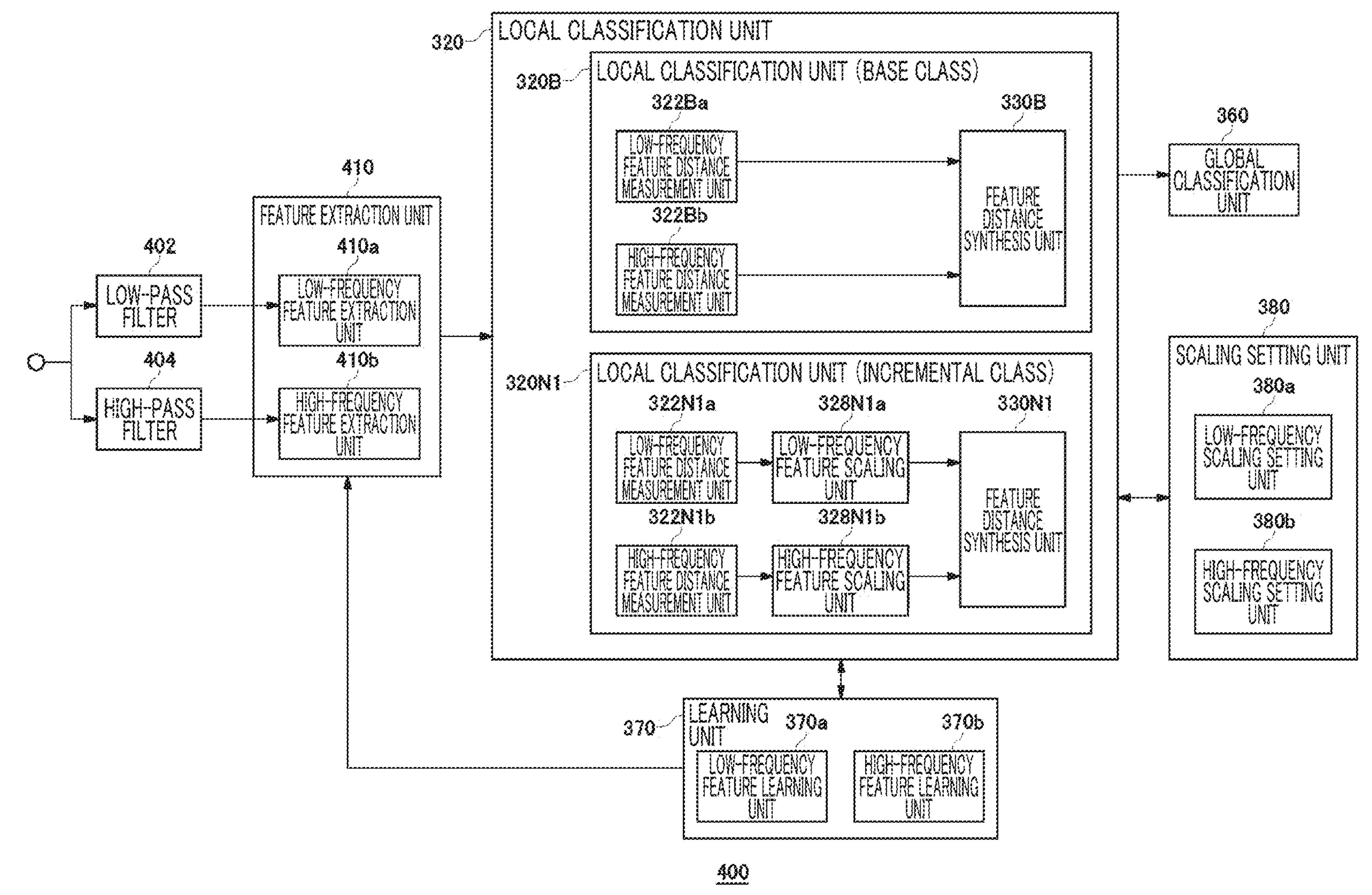
FIG. 19 is a configuration diagram of an image classification apparatus according to the fourth embodiment.

FIG. 19 is a configuration diagram of an image classification apparatus 400 according to the fourth embodiment. The features common to those of the third embodiment are denoted by the same symbols as those of the third embodiment, and a description thereof is omitted.

The image classification apparatus 400 includes a low-pass filter 402, a high-pass filter 404, a feature extraction unit 410, a local classification unit 320, a global classification unit 360, a learning unit 370, and a scaling setting unit 380.

In the third embodiment, the feature frequency transform unit 312 subjects the feature vector output by the feature extraction unit 310 to frequency transform to generate the low-frequency feature vector and the high-frequency feature vector. The fourth embodiment differs in that the low-pass filter 402 and the high-pass filter 404 transform the input image into a low-frequency image and a high-frequency image, respectively, and supply the images to the feature extraction unit 410.

Hereinafter, the symbol "B" indicating the base class of session 0, the symbols "N1", "N2" indicating the incremental class of session 1, session 2 are omitted in order to describe the configuration without distinguishing between the base class and the incremental class.

The low-pass filter 402 transforms the input image into the frequency domain by FFT to remove frequency components higher than a predetermined frequency, transforming the input image into a low-frequency image that is an image comprised of components equal to or lower than a predetermined frequency by inverse FFT. The low-pass filter 402 outputs the low-frequency image to the low-frequency feature extraction unit 410*a* of the feature extraction unit 410.

The low-frequency feature extraction unit 410*a* has the same configuration as the feature extraction unit 10, and, by way of example, outputs a 512-dimension low-frequency feature vector to the low-frequency feature distance measurement unit 322*a* of the local classification unit 320.

The high-pass filter 404 transforms the input image into the frequency domain by FFT to remove frequency components lower than a predetermined frequency, transforming the input image into a high-frequency image that is an image comprised of components equal to or higher than a predetermined frequency by inverse FFT. The high-pass filter 404 outputs the high-frequency image to the high-frequency feature extraction unit 410*b* of the feature extraction unit 410.

The high-frequency feature extraction unit 410*b* has the same configuration as the feature extraction unit 10, and, by way of example, outputs a 512-dimension high-frequency feature vector to the high-frequency feature distance measurement unit 322*b* of the local classification unit 320.

A description of the remaining features and of the subsequent process will be omitted because "general feature vector" and "detailed feature vector" of the second embodiment are merely replaced by "low frequency feature vector" and "high frequency feature vector" in the fourth embodiment.

Fifth Embodiment

Figure 20:
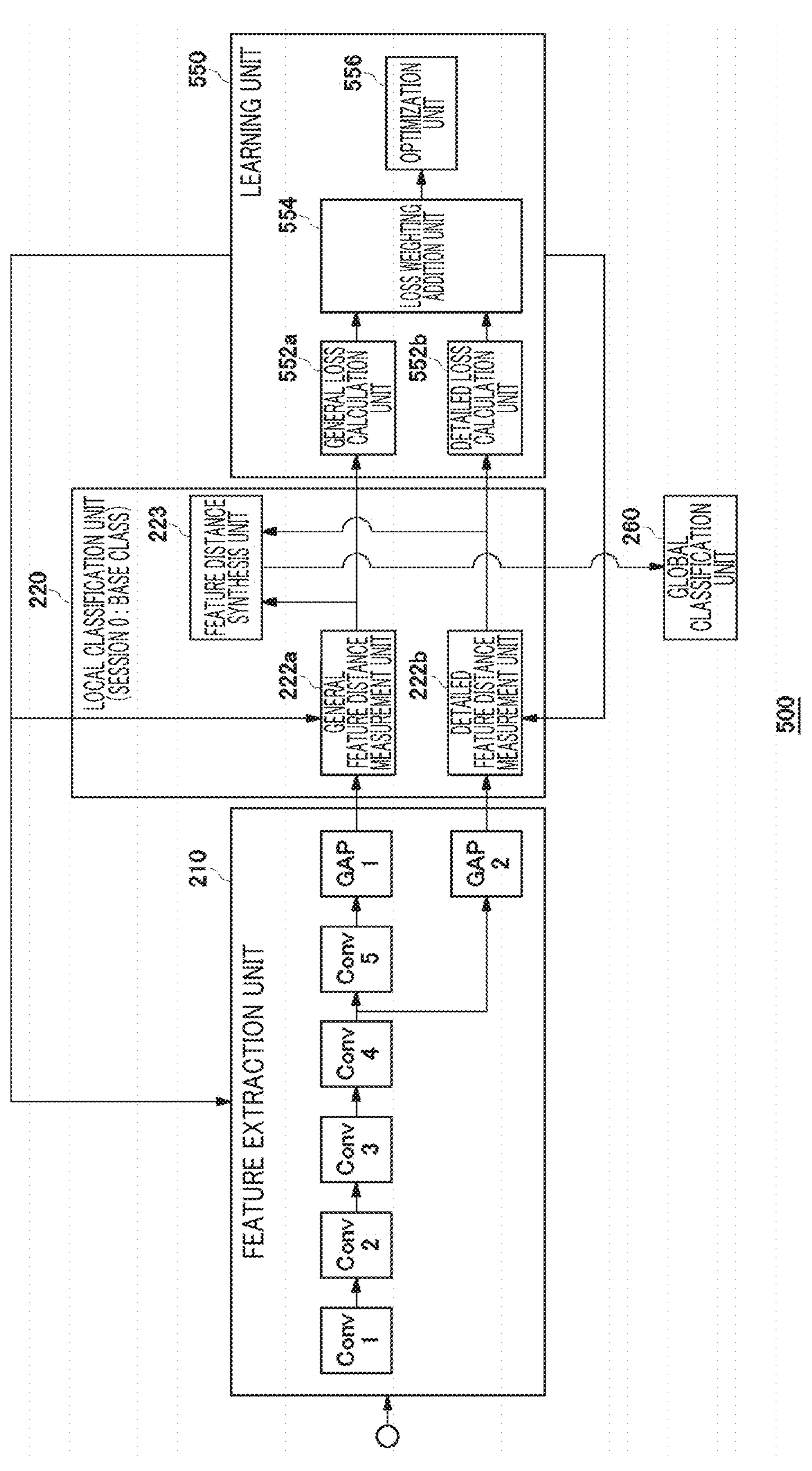
FIG. 20 is a configuration diagram of an image classification apparatus according to the fifth embodiment.
Figure 21:
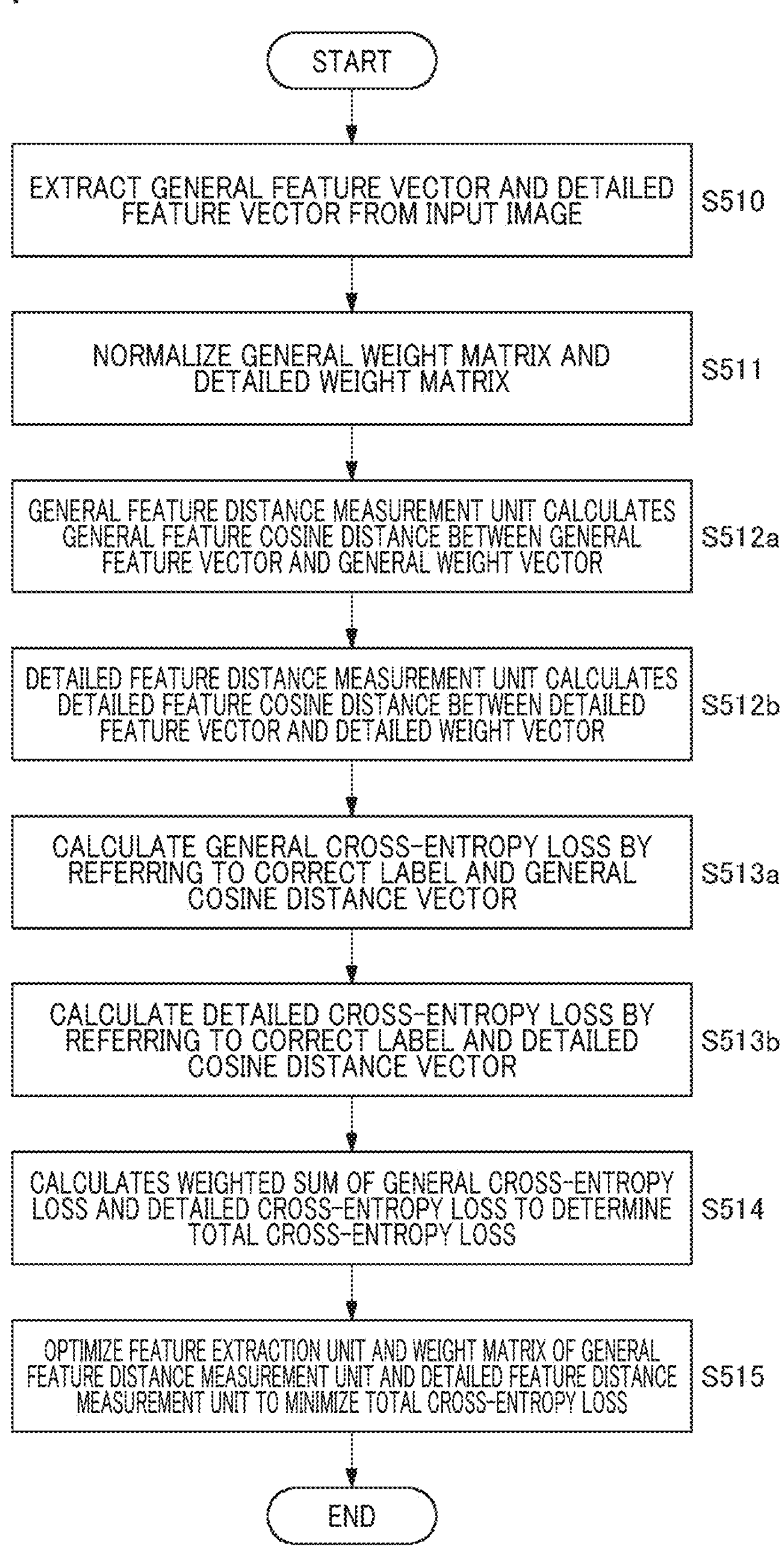
FIG. 21 is a flowchart illustrating a detailed operation of the image classification apparatus according to the fifth embodiment.

FIG. 20 is a configuration diagram of an image classification apparatus 500 according to the fifth embodiment. FIG. 21 is a flowchart illustrating a detailed operation of the image classification apparatus 500 according to the fifth embodiment. The configuration and operation common to those of the second embodiment will be omitted as appropriate. At the time of learning, the feature distance synthesis unit 223 of FIG. 20 need not be available. Further, although this embodiment is described based on the difference from the second embodiment, this embodiment can also be applied to the third embodiment or the fourth embodiment as well as to the second embodiment. When this embodiment is applied to the third embodiment or the fourth embodiment, "low frequency", "high frequency" of the third embodiment and the fourth embodiment need only be replaced with "general", "detail", respectively, in this embodiment. The image classification apparatus 500 may be referred to as "image feature learning apparatus" when the configuration and operation at the time of learning is referred to.

Since the general feature distance measurement unit 222Ba of the base class local classification unit 220B and the general feature distance measurement units 222N1*a*, 222N2*a* of the incremental class local classification units 222N1, 220N2 have the same configuration, they are collectively referred to as the general feature distance measurement unit 222*a* for the purpose of description. Since the detailed feature distance measurement unit 222Bb of the base class local classification unit 220B and the detailed feature distance measurement units 222N1*b*, 222N2*b* of the incremental class local classification units 220N1, 220N2 have the same configuration, they are collectively referred to as the detailed feature distance measurement unit 222*b* for the purpose of description.

In the second embodiment, the feature extraction unit 210 and the general feature distance measurement unit 222*a* are trained by the general feature learning unit 270*a*, and the detailed feature distance measurement unit 222*b* is trained by the detailed feature learning unit 270*b*. In the fifth embodiment, the feature extraction unit 210, the general feature distance measurement unit 222*a*, and the detailed feature distance measurement unit 222*b* are trained by a learning unit 550.

The learning unit 550 includes a general loss calculation unit 552*a*, a detailed loss calculation unit 552*b*, a loss weighting addition unit 554, and an optimization unit 556.

The feature extraction unit 210 extracts a general feature vector and a detailed feature vector from the input image (S510).

The general feature vector output from GAP1 of the feature extraction unit 210 is output to the general feature distance measurement unit 222*a* of the local classification unit 220, and the detailed feature vector output from GAP2 of the feature extraction unit 210 is output to the detailed feature distance measurement unit 222*b* of the local classification unit 220.

The general feature distance measurement unit 222*a* and the detailed feature distance measurement unit 222*b* include a regularizing unit and a weight matrix unit. The normalizing unit of the general feature distance measurement unit 222*a* normalizes the input general feature vector by L2 regularization, and normalizing unit of the detailed feature distance measurement unit 222*b* normalizes the input detailed feature vector by L2 regularization (S511).

The input general feature vector is input to the regularizing unit of the general feature distance measurement unit 222*a* and is normalized, and the normalized general feature vector is input to the weight matrix unit of the general feature distance measurement unit 222*a*. The weight matrix unit of the general feature distance measurement unit 222*a* calculates and outputs a general cosine distance vector of NC dimensions, which is a cosine distance (cosine similarity) between the general feature vector and the general weight vector of each class (S512*a*).

The input detailed feature vector is input to the regularizing unit of the detailed feature distance measurement unit 222*b* and is normalized, and the normalized detailed feature vector is input to the weight matrix unit of the detailed feature distance measurement unit 222*b*. The weight matrix unit of the detailed feature distance measurement unit 222*b* calculates and outputs a detailed cosine distance vector of NC dimensions, which is a cosine distance (cosine similarity) between the detailed feature vector and the detail weight vector of each class (S512*b*).

The general loss calculation unit 552*a* calculates a general cross-entropy loss, which is a loss defined between the general cosine distance vector and the correct label (correct class) of the input image (S513*a*).

The detailed loss calculation unit 552*b* calculates a detailed cross-entropy loss, which is a loss defined between the detailed cosine distance vector and the correct label (correct class) of the input image (S513*b*).

The loss weighting addition unit 554 calculates a weighted sum of the general cross-entropy loss Ld and the detailed cross-entropy loss Ls to determine a total cross-entropy loss L (S514). In this case, $\lambda$ is a predetermined value from 0 to 1 and is, for example, 0.2. λ of 0.2 is used here, but a determination as to which value from 0 to 1 should be used may be, for example, made in the initial session. For example, all values of λ from 0 to 1 in increments of 0.05 may be learned in the initial session to measure accuracy, and the value that produces the optimum classification result may be selected. In such a configuration, the initial session may be performed in an offline process, and the incremental session may be performed in an online process. $L=(1-\lambda)*Ld+\lambda*Ls$ The optimization unit 556 optimizes the feature extraction unit 10, and the weight matrix of the general feature distance measurement unit 222*a* and the detailed feature distance measurement unit 222*b* by backpropagation by using an optimization method such as stochastic gradient descent (SGD) and Adam in such a manner as to minimize the total cross-entropy loss (S515).

When calculating the total cross-entropy loss, the general cross-entropy loss that convolves the entire object is prioritized over the detailed cross-entropy loss that convolves a partial area of the object. When prioritizing general cross-entropy loss, a value of λ described above less than 0.5 is used. That is, when the general cross-entropy loss and the detailed cross-entropy loss are weighted, the weighting coefficient of the general cross-entropy loss is configured to be greater than the weighting coefficient of the detailed cross-entropy loss, and the weighted general cross-entropy loss and the weighted detailed cross-entropy loss are added. As a result, learning can be performed in such a manner as to consider a partial area of the object as well while giving priority to the entire object. More specifically, a plurality of objects in an image which have a similar overall feature but in which features of partial areas differ between objects can be suitably learned.

The above-described various processes in the image classification apparatuses 100, 200, 300, 400, 500 can of course be implemented by an apparatus that uses hardware such as a CPU and a memory but can also be implemented by firmware stored in a ROM (read-only memory), a flash memory, etc., or by software on a computer, etc. The firmware program or the software program may be made available on, for example, a computer readable recording medium. Alternatively, the program may be transmitted and received to and from a server via a wired or wireless network. Still alternatively, the program may be transmitted and received in the form of data broadcast over terrestrial or satellite digital broadcast systems.

Described above is an explanation based on an exemplary embodiment. The embodiment is intended to be illustrative only and it will be understood by those skilled in the art that various modifications to combinations of constituting elements and processes are possible and that such modifications are also within the scope of the present disclosure.

What is claimed is:

1. An image classification apparatus comprising:
- a feature extraction unit that extracts a low-resolution general feature vector of an input image and a high-resolution detailed feature vector of the input image;
- a general feature distance measurement unit that maintains a general weight vector of each class and calculates a general distance vector from the general feature vector and the general weight vector;
- a detailed feature distance measurement unit that maintains a detailed weight vector of each class and calculates a detailed distance vector from the detailed feature vector and the detailed weight vector;
- a feature distance synthesis unit that calculates a synthesized distance vector by synthesizing the general distance vector and the detailed distance vector; and
- a classification unit that determines a class of the input image based on the synthesized distance vector.

2. The image classification apparatus according to claim 1, further comprising:
- a learning unit that trains the feature extraction unit, the general feature distance measurement unit, and the detailed feature distance measurement unit in response to an input image of a base class and trains the general feature distance measurement unit and the detailed feature distance measurement unit in response to an input image of an addition class in such a manner as to minimize a loss calculated from the synthesized distance vector and a correct class of the input image.

3. An image classification method comprising:
- extracting a low-resolution general feature vector of an input image and a high-resolution detailed feature vector of the input image;
- maintaining a general weight vector of each class and calculating a general distance vector from the general feature vector and the general weight vector;
- maintaining a detailed weight vector of each class and calculating a detailed distance vector from the detailed feature vector and the detailed weight vector;
- calculating a synthesized distance vector by synthesizing the general distance vector and the detailed distance vector; and
- determining a class of the input image based on the synthesized distance vector.

4. A non-transitory computer-readable medium having an image classification program comprising computer-implemented modules including:
- a feature extraction module that extracts a low-resolution general feature vector of an input image and a high-resolution detailed feature vector of the input image;
- a general feature distance measurement module that maintains a general weight vector of each class and calculates a general distance vector from the general feature vector and the general weight vector;
- a detailed feature distance measurement module that maintains a detailed weight vector of each class and calculates a detailed distance vector from the detailed feature vector and the detailed weight vector;
- a feature distance synthesis module that calculates a synthesized distance vector by synthesizing the general distance vector and the detailed distance vector; and
- a classification module that determines a class of the input image based on the synthesized distance vector.

* * * * *